(12) United States Patent
Inose et al.

(10) Patent No.: US 10,071,683 B2
(45) Date of Patent: *Sep. 11, 2018

(54) ATTACHMENT STRUCTURE FOR LIGHTING DEVICE

(71) Applicant: TS TECH CO., LTD., Asaka-shi, Saitama (JP)

(72) Inventors: Takayuki Inose, Tochigi-ken (JP); Naoki Ozono, Tochigi-ken (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,927

(22) Filed: Nov. 21, 2017

(65) Prior Publication Data

US 2018/0093608 A1 Apr. 5, 2018

Related U.S. Application Data

(63) Continuation of application No. 14/897,818, filed as application No. PCT/JP2014/062780 on May 14, 2014, now Pat. No. 9,840,195.

(30) Foreign Application Priority Data

| Jun. 13, 2013 | (JP) | 2013-124327 |
| Jun. 13, 2013 | (JP) | 2013-124940 |
| Jun. 13, 2013 | (JP) | 2013-124942 |

(51) Int. Cl.
*B60Q 3/51* (2017.01)
*B60Q 3/64* (2017.01)
(Continued)

(52) U.S. Cl.
CPC ............... *B60Q 3/51* (2017.02); *B60Q 3/20* (2017.02); *B60Q 3/217* (2017.02); *B60Q 3/64* (2017.02)

(58) Field of Classification Search
CPC ... B60Q 3/54; B60Q 3/61; B60Q 3/20; B60Q 3/217
See application file for complete search history.

(56) References Cited

U.S. PATENT DOCUMENTS

| 7,377,673 B1 * | 5/2008 | Hsiao ............... B62J 6/00 |
| | | 362/190 |
| 9,016,914 B2 | 4/2015 | Ukai et al. |
| | | (Continued) |

FOREIGN PATENT DOCUMENTS

| JP | 01-079208 U | 5/1989 |
| JP | H10-226235 A | 8/1998 |
| | (Continued) | |

OTHER PUBLICATIONS

International Search Report for PCT/JP2014/062780 with English translation thereof.

*Primary Examiner* — Mary Ellen Bowman
(74) *Attorney, Agent, or Firm* — Carrier Blackman & Associates, P.C.; Joseph P. Carrier; Jingli Wang

(57) ABSTRACT

An attachment structure for a lighting device, with which it is possible to reduce the time that attachment requires and stably attach a lighting device to a curved surface on which the lighting device is to be attached without using a screw member. This attachment structure for a lighting device is equipped with: a base provided on a curved surface of a door lining and having a plate-shaped base section; and an attachment part provided on the base and used for affixing the lighting device to the base section.

12 Claims, 24 Drawing Sheets

(51) Int. Cl.
*B60Q 3/217* (2017.01)
*B60Q 3/20* (2017.01)

(56) References Cited

U.S. PATENT DOCUMENTS

| | | | | |
|---|---|---|---|---|
| 2008/0314944 A1* | 12/2008 | Tsai | ............... | F21S 2/005 224/331 |
| 2010/0188863 A1 | 7/2010 | West | | |
| 2014/0056000 A1 | 2/2014 | Tsushima | | |

FOREIGN PATENT DOCUMENTS

| JP | 2001-155801 A | 6/2001 |
|---|---|---|
| JP | 2007-314073 A | 12/2007 |
| JP | 3143708 U | 7/2008 |
| JP | 2010-500516 A | 1/2010 |
| JP | 2012-086620 A | 5/2012 |
| JP | 2012-089602 A | 5/2012 |
| JP | 4933240 B2 | 5/2012 |
| JP | 2012-250622 A | 12/2012 |
| JP | 2013-022990 A | 2/2013 |
| JP | 2013-086534 A | 5/2013 |

* cited by examiner

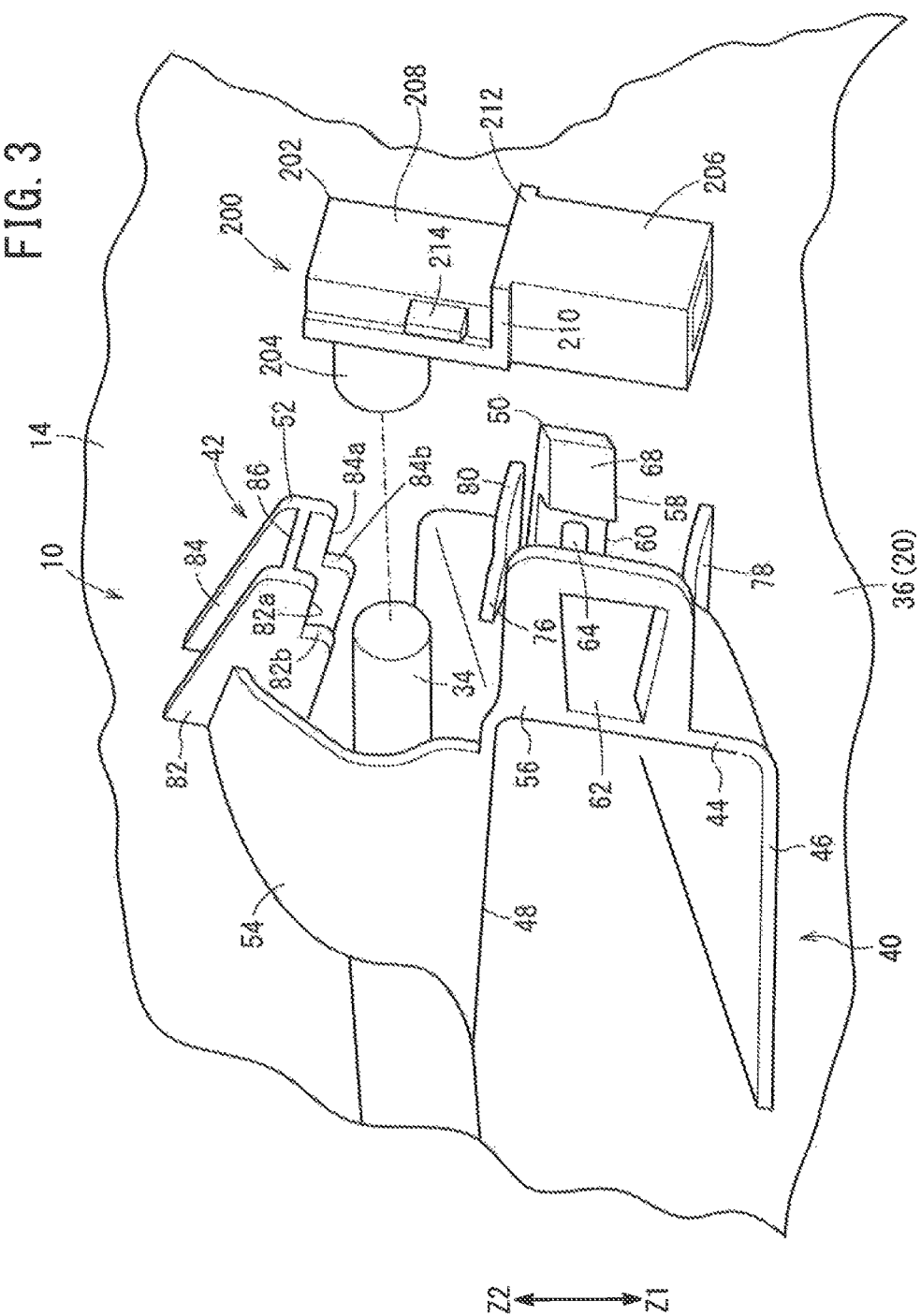

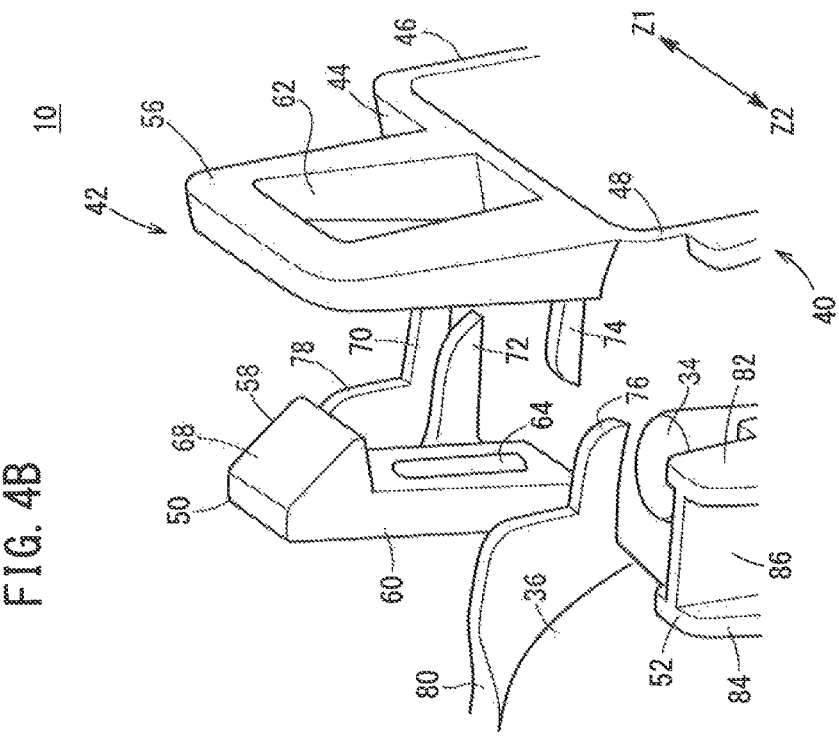
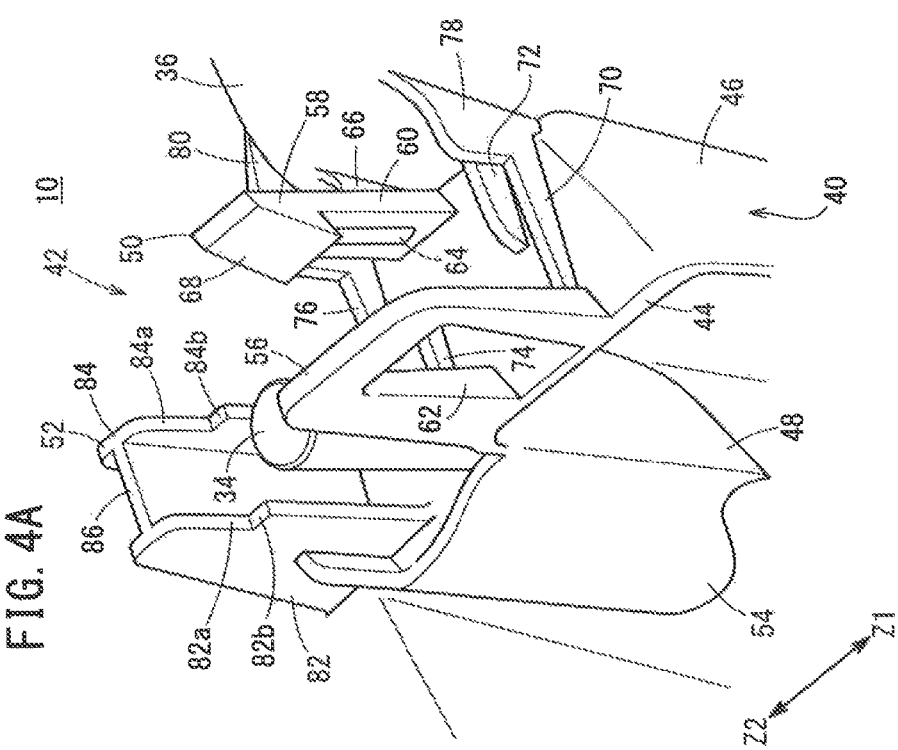

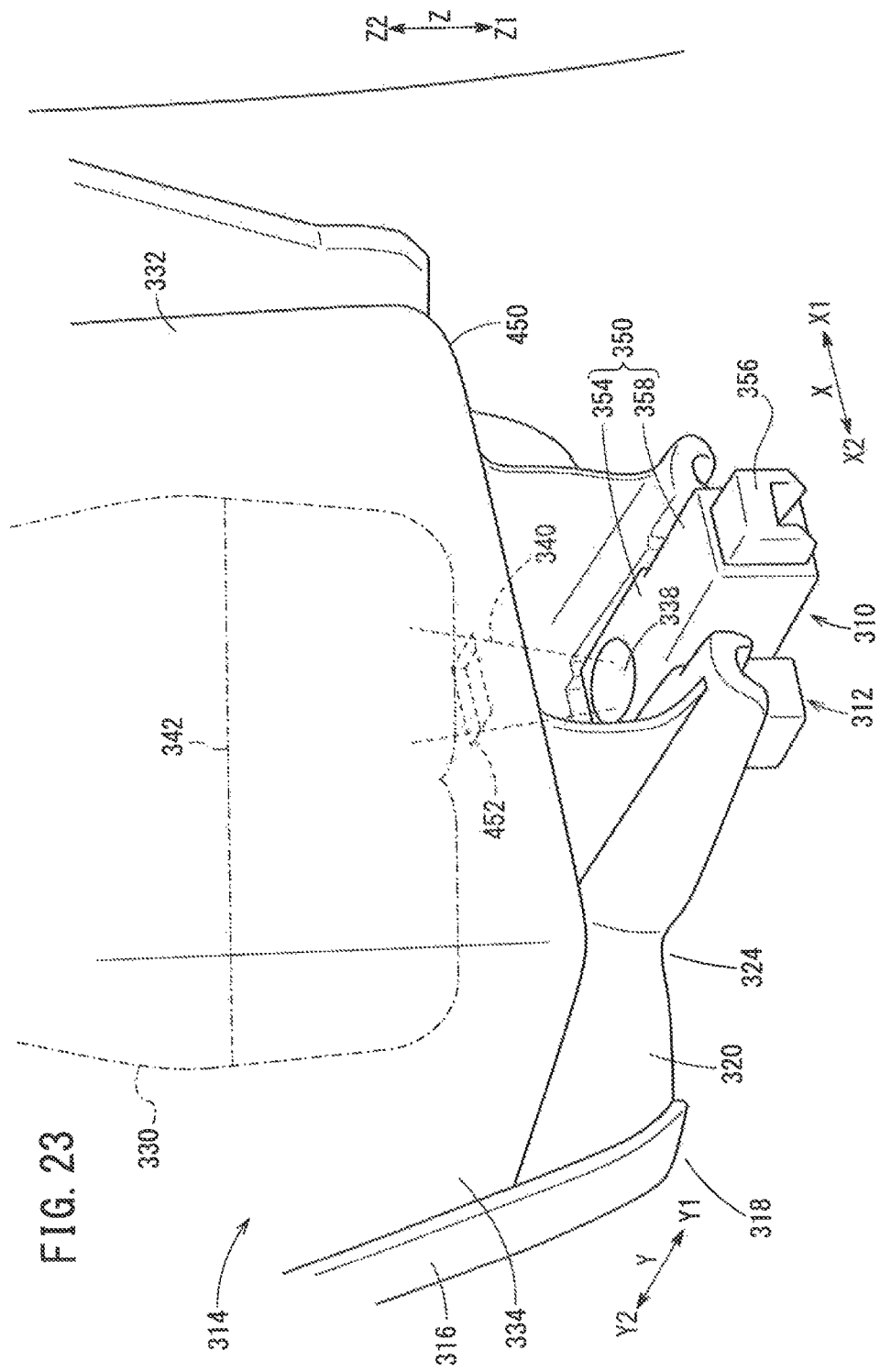

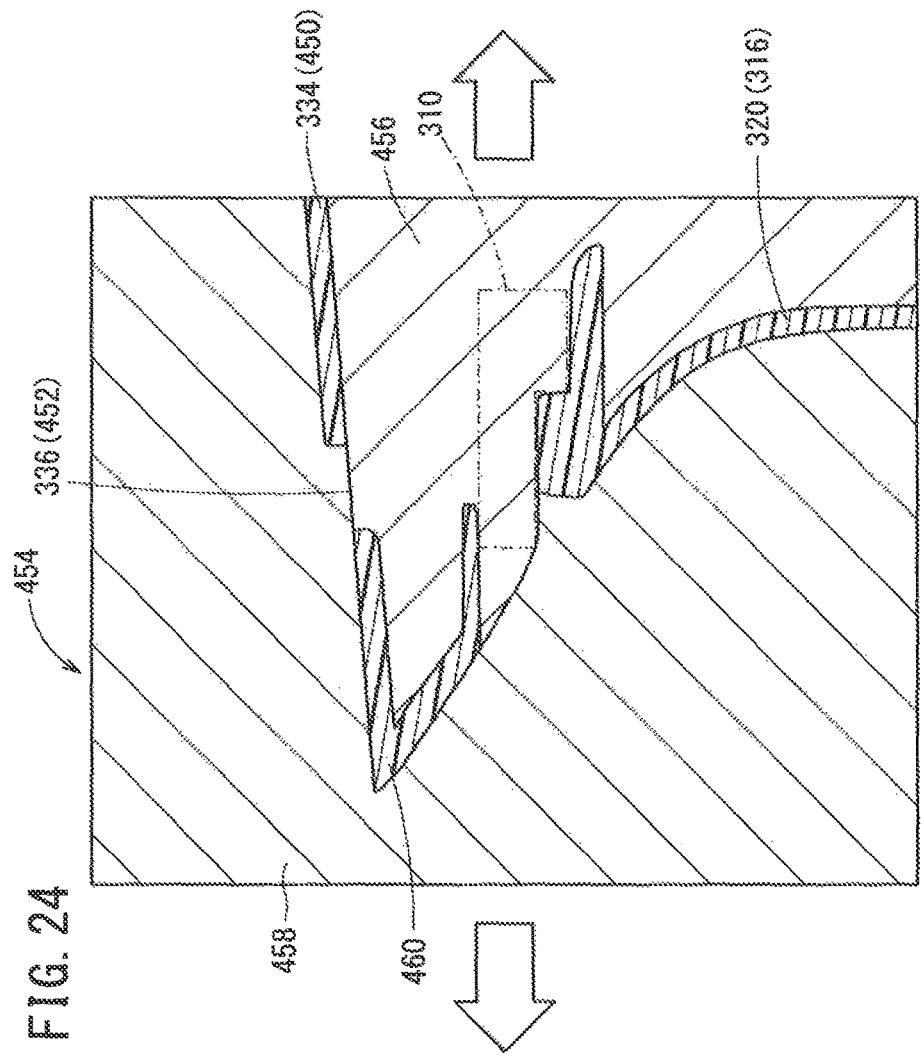

ATTACHMENT STRUCTURE FOR LIGHTING DEVICE

CROSS-REFERENCE TO RELATED APPLICATIONS

The present application is a continuation of prior U.S. patent application Ser. No. 14/897,818 filed 11 Dec. 2015 as the US National Phase of International Application PCT/JP2014/062780 filed 14 May 2014, which claims priority based on Japanese Patent Application Nos. 2013-124327, 2013-124940 and 2013-124942, all filed 13 Jun. 2013. The entire disclosures of all the above-mentioned prior US, International and Japanese patent applications are incorporated by reference herein.

TECHNICAL FIELD

The present invention relates to an attachment structure for a lighting device for attaching the lighting device with respect to a curved surface of an attachment object.

BACKGROUND ART

A situation is known, for example, in which a lighting device that is used in the interior of a vehicle is attached with respect to a curved surface of a door lining. In this case, frequently, the casing that constitutes the lighting device is not of a shape that corresponds to the curved surface of the door lining, and the lighting device tends to be attached unstably with respect to the door lining.

In Japanese Patent No. 4933240, a technical concept is disclosed in which a lighting device is attached stably with respect to the curved surface of a door lining, by fastening the lighting device, which has a substantially rectangular tubular housing, to the door lining using screw members.

SUMMARY OF INVENTION

However, with the conventional technology disclosed in Japanese Patent No. 4933240, when the lighting device is attached with respect to the curved surface of the door lining (attachment object), since a fastening operation using screw members is required, a problem occurs in that the number of steps to attach the lighting device increases.

The present invention has been devised taking into consideration the aforementioned problems, and has the object of providing an attachment structure for a lighting device, which enables the lighting device to be attached stably with respect to a curved surface of an attachment object without using screw members, and thus enables the number of assembly steps to be reduced.

The attachment structure for a lighting device according to the present invention includes the following features.

First Feature: The attachment structure for a lighting device is equipped with a pedestal disposed on a curved surface of an attachment object and configured to include a flat plate-shaped base section, and an attachment member configured to fix the lighting device with respect to the base section.

Second Feature: The base section extends along a vertical direction, and movement of the lighting device in a vertically downward direction with respect to the base section is restricted by at least one of the pedestal and the attachment member.

Third Feature: The attachment member includes a supporting wall section erected from the base section, and a claw member disposed on a distal end of the supporting wall section and configured to restrict movement of the lighting device away from the base section.

Fourth Feature: The attachment member further includes a side wall section erected from the base section and in surface contact with one side surface of the lighting device, and a projection projecting toward the side wall section from the supporting wall section and in line contact with another side surface of the lighting device.

Fifth Feature: The projection extends along a direction of extension of the supporting wall section with a cross-section thereof being formed in an arcuate shape.

Sixth Feature: The projection is formed so as to have a lengthwise dimension shorter than a lengthwise dimension of the supporting wall section.

Seventh Feature: The projection is formed so as to have a widthwise dimension shorter than a widthwise dimension of the supporting wall section.

Eighth Feature: A draft angle oriented toward a distal end of the side wall section is set on a contact surface of the side wall section that is in contact with the lighting device, and the supporting wall section is erected on the base section while being inclined with respect to a line perpendicular to a plane of the base section toward the side wall section, at an angle that is substantially same as the draft angle.

Ninth Feature: The attachment member includes protrusions disposed on the base section and configured to contact a surface on the lighting device that is directed toward the base section, and contact surfaces of the protrusions configured to be in contact with the lighting device are inclined with respect to the plane of the base section toward the side wall section and the base section, at an angle that is substantially same as the draft angle.

Tenth Feature: A die-cut hole is formed on the side wall section at a location facing the supporting wall section.

Eleventh Feature: The pedestal includes an upper side wall section disposed integrally with an upper end of the base section and the curved surface of the attachment object, and configured to restrict vertical downward movement of the lighting device.

Twelfth Feature: The pedestal includes a lower side wall section disposed integrally with a lower end of the base section and the curved surface of the attachment object.

Thirteenth Feature: The attachment member includes a movement restricting member configured to restrict upward movement of the lighting device.

According to the first feature of the present invention, the lighting device can be fixed by the attachment member with respect to the flat plate-shaped base section of the pedestal, which is provided on the curved surface of the attachment object. Accordingly, without using screw members, the lighting device can be attached stably with respect to the curved surface of the attachment object. Thus, the number of attachment steps required for the lighting device can be reduced.

According to the second feature of the present invention, even in the case that the base section extends in a vertical direction, since vertical movement of the lighting device with respect to the base section is restricted, the lighting device can be fixed to the base section.

According to the third feature of the present invention, since the claw member can restrict movement of the lighting device in a direction away from the base section, the lighting device can be fixed stably with respect to the base section.

According to the fourth feature, one side surface of the lighting device is in surface contact with a side wall section, and another side surface of the lighting device is in line contact with a projection provided on the supporting wall section. As a result, the lighting device can be fixed in a more stable manner with respect to the base section. Further, compared to a case in which both side surfaces of the lighting device are in surface contact with the attachment member, looseness or chattering of the lighting device with respect to the base section can be suppressed without requiring an increase in the dimensional precision of the lighting device and the attachment structure.

According to the fifth feature, since the projection, the transverse cross section of which is formed in an arcuate shape, extends along the direction of extension of the supporting wall section, the projection can be placed in line contact with respect to the other side surface of the lighting device.

According to the sixth feature, since the lengthwise dimension of the projection is shorter than the lengthwise dimension of the supporting wall section, compared to a situation in which the projection were formed to span over the entire length of the supporting wall section, the supporting wall section can easily be bent. In this case, the lighting device can be mounted easily with respect to the attachment member, by bending the supporting wall section and displacing the claw member toward a side that is opposite to the side where the side wall section is positioned.

According to the seventh feature, since the widthwise dimension of the projection is shorter than the widthwise dimension of the supporting wall section, compared to a situation in which the projection were formed to span over the entire width of the supporting wall section, the supporting wall section can easily be bent. Consequently, the lighting device can easily be mounted with respect to the attachment member.

According to the eighth feature of the present invention, even in the case that a draft angle is set on a contact surface with the lighting device within the side wall section, looseness or chattering of the lighting device with respect to the base section can be suppressed.

According to the ninth feature of the present invention, the contact surfaces of the protrusions that are in contact with the lighting device are inclined with respect to a flat surface of the base section toward the side wall section, at an angle that is substantially the same as the draft angle of the side wall section. Consequently, for example, even in the case that the casing of the lighting device was constituted in the form of a polygonal tube, looseness or chattering of the lighting device with respect to the base section can be suppressed.

According to the tenth feature of the present invention, the claw member can be formed easily by a mold (slide mold) that is passed through the die-cut hole formed in the side wall section.

According to the eleventh feature of the present invention, since the pedestal includes the upper side wall section that is disposed integrally with an upper end of the base section and the curved surface of the attachment object, the rigidity of the pedestal can be increased. Therefore, the lighting device can be attached more stably with respect to the curved surface of the attachment object. Further, by the upper side wall section, which is comparatively high in rigidity, vertical downward movement of the lighting device relative to the base section can be restricted.

According to the twelfth feature of the present invention, since the pedestal includes the lower side wall section that is disposed integrally with a lower end of the base section and the curved surface of the attachment object, the rigidity of the pedestal can further be increased.

According to the thirteenth feature of the present invention, since upward movement of the lighting device relative to the base section is restricted by the movement restricting member, the lighting device can be attached more stably to the curved surface of the attachment object.

BRIEF DESCRIPTION OF DRAWINGS

FIG. 3 is a perspective view showing a condition in which the lighting device is mounted on the attachment structure;

FIG. 4A is a perspective view of the attachment structure shown in FIG. 3;

FIG. 4B is a perspective view of the attachment structure of FIG. 4A as seen from another angle;

FIG. 23 is a perspective view showing a situation in which the attachment structure and the lighting device are arranged at a location that differs from the position shown in FIG. 11; and FIG. 24 is an explanatory view in which a mold for forming the attachment structure and a drink holder is shown schematically.

DESCRIPTION OF EXEMPLARY EMBODIMENTS

A presently preferred embodiment of an attachment structure for a lighting device according to the present invention will be described below with reference to the accompanying drawings, in relation to a door lining in which the attachment structure is incorporated.

First Embodiment

Figure 1:
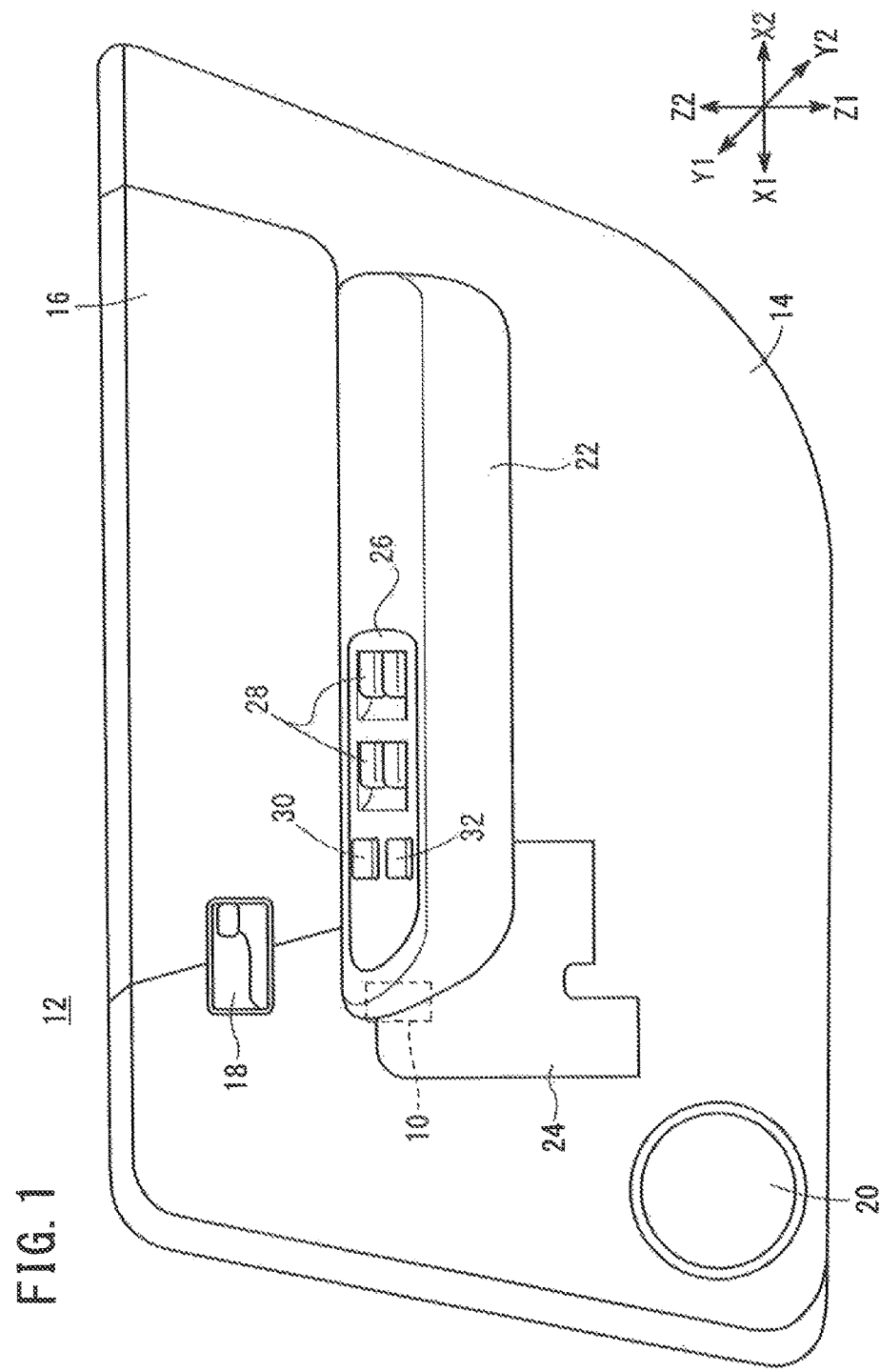
FIG. 1 is a perspective view of a door lining to which there is applied an attachment structure for a lighting device according to a first embodiment of the present invention.

As shown in FIG. 1, a door lining 12 (attachment object) according to a first embodiment of the present invention is constituted, for example, from a resin material such as plastic or the like, and is mounted on an inner side of a door panel of a vehicle (automobile). In the following description, a vehicle forward direction of the door lining 12 will be referred to as an X1 direction, a vehicle rearward direction thereof will be referred to as an X2 direction, an outside vehicle transverse direction will be referred to as a Y1 direction, an inside vehicle transverse direction will be referred to as a Y2 direction, a vertical downward direction will be referred to as a Z1 direction, and a vertical upward direction will be referred to as a Z2 direction.

The door lining 12 is equipped with a base trim 14, an upper trim 16 that is connected to the base trim 14 and makes up an upper portion of the door lining 12, and a door knob 18. A speaker 20 is arranged on a forward lower portion of the base trim 14. On the base trim 14, there are formed a door arm rest 22 that extends in forward and rearward directions of the vehicle (left and right directions of FIG. 1), and a cavity 24 that is positioned in a forward direction (X1 direction) of the door arm rest 22, and is formed by a portion of the base trim 14 being recessed in the outside vehicle transverse direction (Y1 direction).

Figure 2:
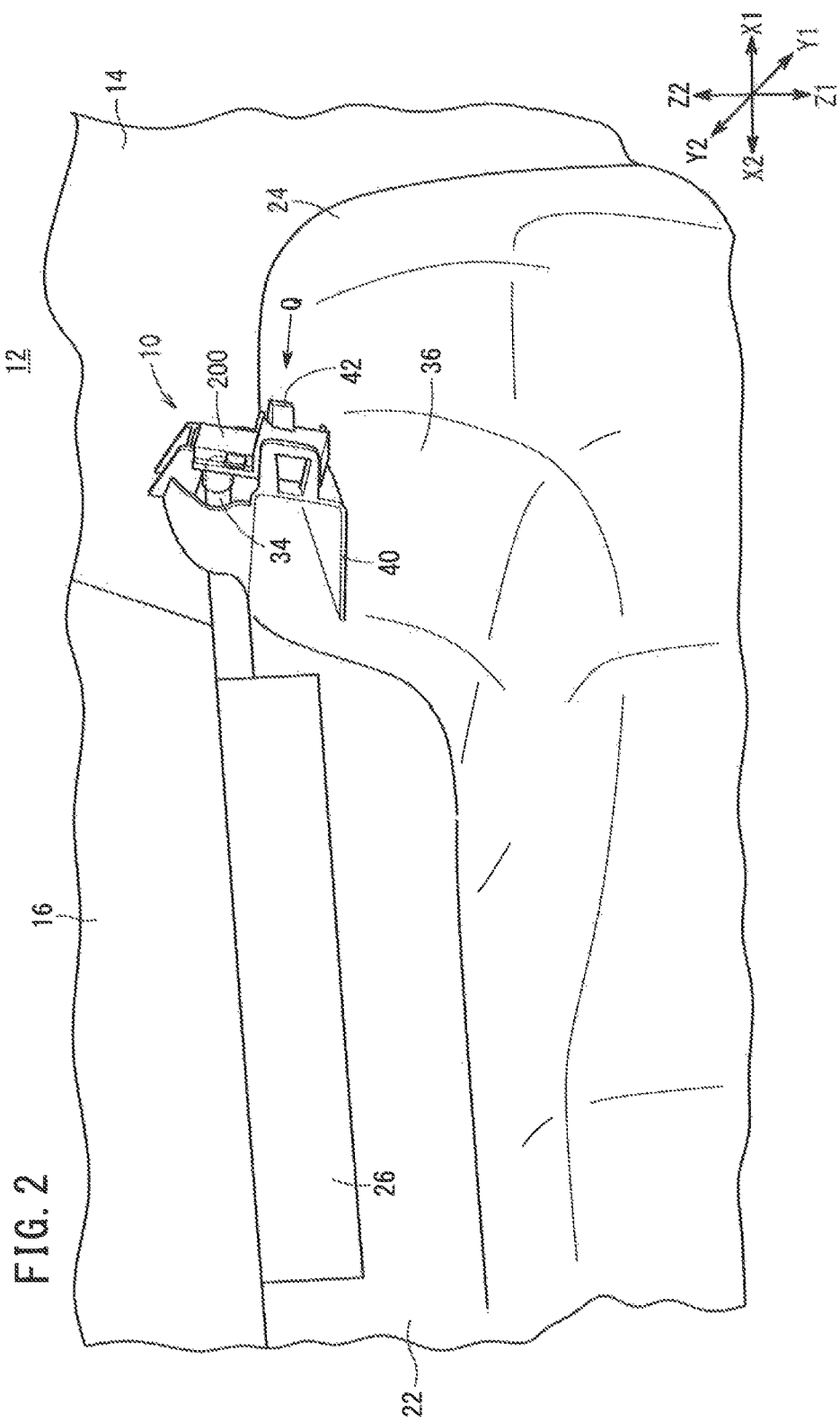
FIG. 2 is a partially enlarged perspective view of a rear surface side of the door lining.

As shown in FIG. 2, the door arm rest 22 is formed by a portion of the panel shaped base trim 14 projecting in the inside vehicle transverse direction (Y2 direction). Additionally, a switch unit 26 is arranged on an inner portion of the door arm rest 22. The switch unit 26 includes a plurality of switches 28, 30, 32 (see FIG. 1). In the present embodiment, the switches 28 are constituted as power window switches, the switch 30 is constituted as a door lock switch, and the switch 32 is constituted as a mirror switch, respectively. However, the functions and number of the switches 28, 30, 32 can be set arbitrarily.

A light guide 34 for guiding light of a lighting device 200 to the respective switches 28, 30, 32 is connected to the switch unit 26. The light guide 34 can be constituted from an optical fiber, for example.

A curved surface 36, which is contiguous with a back surface (rear surface) of the cavity 24 and on which an attachment structure 10 for fixing the lighting device 200 is disposed, is formed on the back surface (rear surface) of the door arm rest 22.

Figure 5:
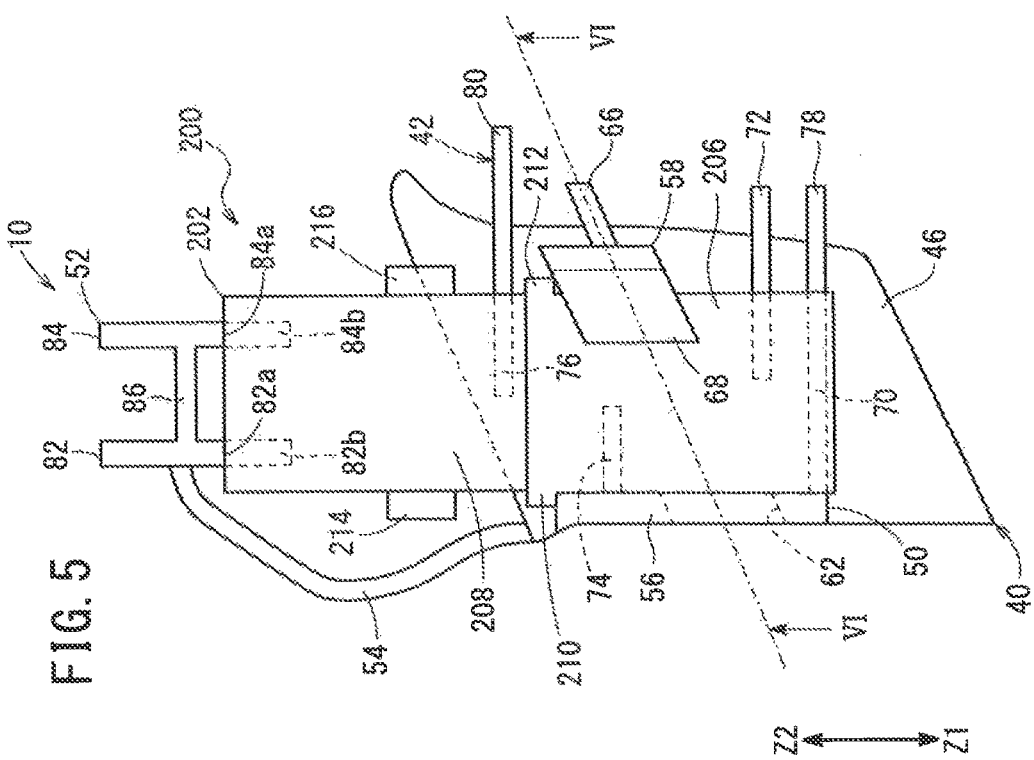
FIG. 5 is a view as shown from the direction of the arrow Q in FIG. 2.
Figure 6:
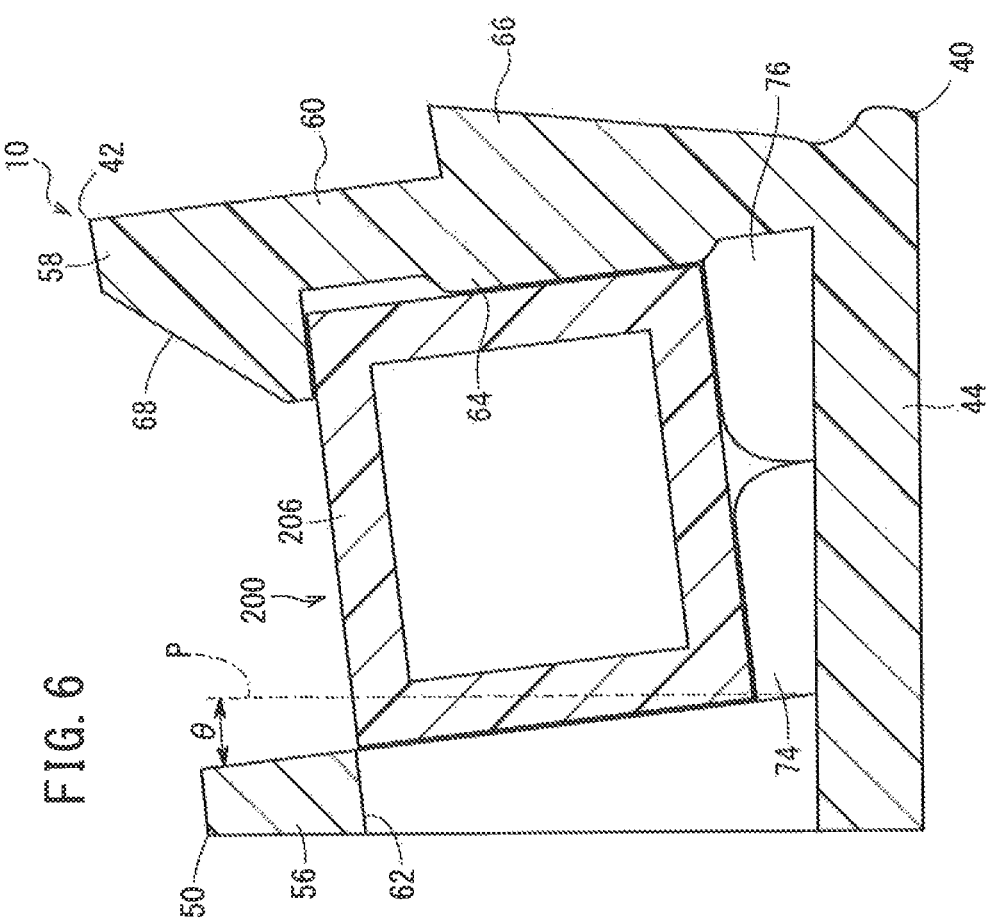
FIG. 6 is a cross-sectional view with partial omission taken along line VI-VI of FIG. 5.
Figure 7:
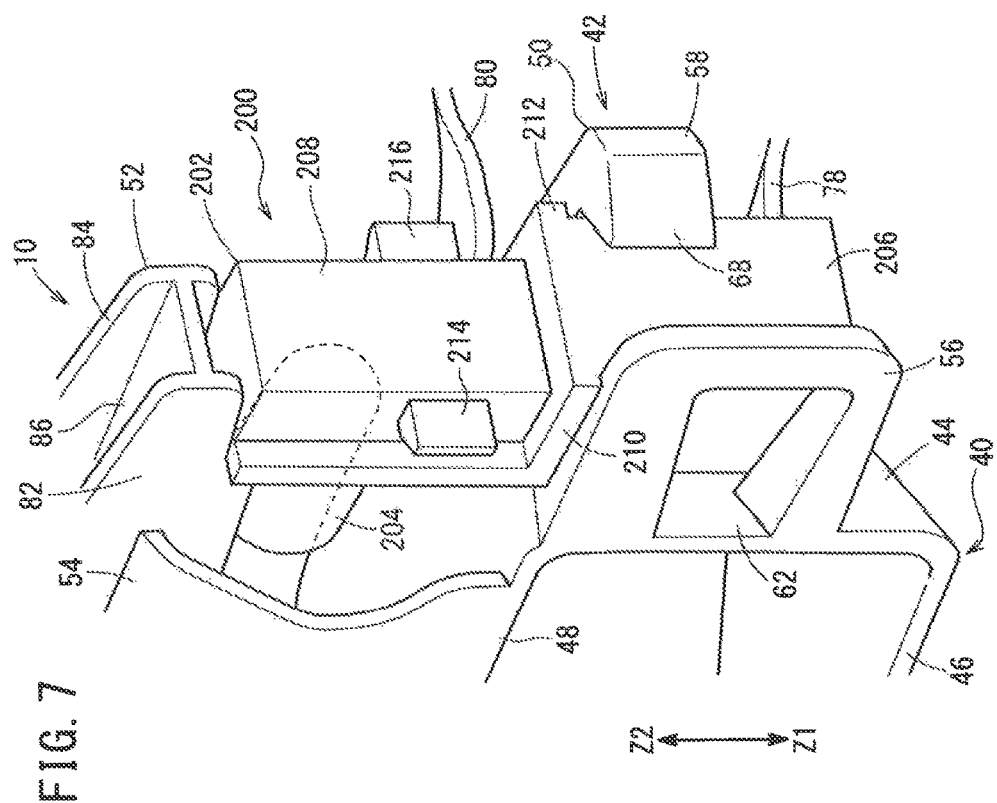
FIG. 7 is an enlarged perspective view with partial omission of the attachment structure on which the lighting device is mounted.

As shown in FIGS. 3, 5, and 7, the lighting device 200 is equipped with a casing 202 in which a non-illustrated light-emitting element is installed, and a connecting member 204 disposed in the casing 202 and connected to an end of the light guide 34. The casing 202 and the connecting member 204 are constituted from a resin material such as plastic or the like. The casing 202 includes a connector 206 to which a non-illustrated wire harness (electrical wiring) is connected, and a lighting unit 208 contiguous with the connector 206.

The connector 206 is constituted in a substantially rectangular tubular shape, and on an end thereof on the side of the lighting unit 208, flanges 210, 212 are formed that project on both left and right sides. The lighting unit 208 extends along the longitudinal direction of the connector 206, and the front surface thereof (the surface where the connecting member 204 is provided) is coplanar with the front surface of the connector 206.

A thickness dimension of the lighting unit 208 is smaller than the thickness dimension of the connector 206. More specifically, the lighting device 200 exhibits a shape in which the connector 206 protrudes out somewhat more than the lighting unit 208 on the back surface side. Claw members 214, 216 are provided on both side surfaces of the lighting unit 208.

The connecting member 204 is a tubular member, which is formed to project in a forward direction from the front surface of the lighting unit 208, and the axis thereof is disposed to coincide substantially with the optical axis of the light-emitting element. Therefore, in a state in which the end of the light guide 34 is connected to an inner hole of the connecting member 204, light generated from the light-emitting element is introduced into the light guide 34.

Although the lighting device 200 according to the present embodiment is constructed basically as described above, the lighting device 200 may be constituted in a similar manner to the light-emitting device (lighting device) disclosed in Japanese Laid-Open Patent Publication No. 2012-086620.

Next, the attachment structure 10 for the lighting device 200 will be described. The attachment structure 10 is formed integrally with the door arm rest 22 by a resin material such as plastic or the like. However, the attachment structure 10 need not necessarily be an integrally molded article formed by a resin.

As shown in FIGS. 3 through 7, the attachment structure 10 is equipped with a pedestal 40, which is formed to project in a substantially U-shape on the curved surface 36 of the door arm rest 22, and an attachment member 42 that fixes the lighting device 200 to the pedestal 40. The pedestal 40 includes a flat plate-shaped base section 44 that extends in a substantially vertical direction, a lower side wall section 46 disposed on a lower end (an end in the Z1 direction) of the base section 44, and an upper side wall section 48 disposed on an upper end (an end in the Z2 direction) of the base section 44. The upper side wall section 48 is positioned vertically downward from the end of the light guide 34.

The attachment member 42 includes an attachment member main body 50 that is disposed on the base section 44, a movement restricting member 52 disposed on a back surface of the base trim 14 and which contacts the lighting unit 208 of the lighting device 200, and a connecting wall section 54 that interconnects the upper side wall section 48 and the movement restricting member 52. The attachment member main body 50 includes a wide side wall section 56 that is erected from one side (a side remote from the curved surface 36) of the base section 44, and a thin supporting wall section 60 that is erected from another side (a side near to the curved surface 36) of the base section 44, and on which an engagement claw 58 (claw member) is provided on a distal end thereof.

The side wall section 56 is a substantially rectangular plate-shaped member, and extends to the upper side wall section 48 somewhat from above the lower side wall section 46. At a location on the side wall section 56 that faces the supporting wall section 60, a die-cut hole 62 of a shape corresponding to the supporting wall section 60 is formed. The side wall section 56 is erected substantially perpendicular to the base section 44. As understood from FIG. 6, a surface of the side wall section 56 on the side of the supporting wall section 60 is in surface contact with one side surface of the connector 206 that constitutes part of the lighting device 200. On the contact surface (a surface on the supporting wall section 60 side of the side wall section 56) within the side wall section 56 that is in contact with the connector 206, a draft angle of a predetermined angle θ toward the distal end of the side wall section 56 is set.

The supporting wall section 60 is erected on the base section 44 while being inclined with respect to a line P perpendicular to the plane of the base section 44 toward the side of the side wall section 56, at an angle (predetermined angle θ) that is substantially the same as the draft angle of the side wall section 56. A projection 64, which projects out toward the side of the side wall section 56, is formed on the supporting wall section 60.

The projection 64 includes an outer surface of an arcuate shape in transverse cross section, and the projection 64 extends along the direction of extension of the supporting wall section 60. Consequently, the projection 64 is placed in line contact with the other side surface of the connector 206. In a state in which the projection 64 is positioned substantially centrally in the longitudinal direction of the supporting wall section 60, the lengthwise dimension of the projection 64 is formed to be shorter than the lengthwise dimension of the supporting wall section 60. Further, in a state in which the projection 64 is positioned substantially centrally in the transverse direction of the supporting wall section 60, the widthwise dimension of the projection 64 is formed to be shorter than the widthwise dimension of the supporting wall section 60. Owing thereto, since the supporting wall section 60 can be flexed appropriately, it is possible to suitably carry out attachment and detachment of the engagement claw 58 to and from the connector 206.

On a surface of the supporting wall section 60 on an opposite side from the surface where the projection 64 is formed, a rib 66 is provided that extends from a proximal end at a substantially central position in the transverse direction thereof to a substantially central position in the longitudinal direction. The rib 66 is disposed integrally with the curved surface 36 of the door arm rest 22. By providing the rib 66 in this manner, the rigidity of the supporting wall section 60 can be increased.

The engagement claw 58 is formed integrally on a distal end of the supporting wall section 60. The engagement claw 58 projects toward the side of the side wall section 56 beyond the supporting wall section 60, and contacts a back surface of the connector 206 that makes up part of the lighting device 200 (see FIG. 6). The engagement claw 58 is formed with a tapered surface 68, which is inclined toward the side wall section 56 and to the side of the base section 44.

The attachment member main body 50 includes first through fourth protrusions 70, 72, 74, 76 provided on the base section 44 and which extend substantially in a horizontal direction (see FIG. 5). The first protrusion 70 extends from a lower end of the side wall section 56 to the other end of the base section 44. The second protrusion 72 extends to the other end of the base section 44 from a substantially center position in the transverse direction of the base section 44, at a location slightly more upwardly (in the Z2 direction) than the first protrusion 70. The third protrusion 74 extends from the side wall section 56 to a substantially center position in the transverse direction of the base section 44, at a location more upwardly than the second protrusion 72. The fourth protrusion 76 extends to the other end of the base section 44 from a substantially center position in the transverse direction of the base section 44, at a location more upwardly than the third protrusion 74.

The projecting lengths of the first through fourth protrusions 70, 72, 74, 76 become progressively greater from the one ends to the other ends thereof. More specifically, toward the side of the side wall section 56, the distal end surface of each of the first through fourth protrusions 70, 72, 74, 76 is inclined to the side of the base section 44 at a predetermined angle θ with respect to the plane of the base section 44. In accordance with this feature, the distal end surface of each of the first through third protrusions 70, 72, 74 comes into contact with the front surface (a surface directed toward the base section 44) of the connector 206 that makes up the lighting device 200, whereas the distal end surface of the fourth protrusion 76 comes into contact with the front surface of the lighting unit 208 that makes up the lighting device 200.

On the other end of the first protrusion 70, a plate-shaped wall portion 78 is erected that contacts another side surface of the connector 206, and on the other end of the fourth protrusion 76, a plate-shaped wall portion 80 is erected that contacts another side surface of the lighting unit 208. The wall portions 78, 80 are formed integrally with the curved surface 36.

The movement restricting member 52 is formed to project in the direction of extension of the side wall section 56, with a substantially H shape, from a portion positioned upwardly (in the Z2 direction) from an end of the light guide 34 on a back surface (rear surface) of the base trim 14. The movement restricting member 52 includes a pair of restricting plates 82, 84 arranged in facing relation and disposed on the back surface of the base trim 14, and an intermediate plate 86 connected to the restricting plates 82, 84.

The respective restricting plates 82, 84 are formed to gradually narrow toward the distal ends thereof. By providing a cutout on a lower portion on the distal end side of the restricting plate 82, an upper restricting surface 82a that contacts the upper surface of the lighting unit 208, and a frontward restricting surface 82b that contacts the front surface of the lighting unit 208 are formed. Similarly, by providing a cutout on a lower portion on the distal end side of the restricting plate 84, an upper restricting surface 84a that contacts the upper surface of the lighting unit 208, and a frontward restricting surface 84b that contacts the front surface of the lighting unit 208 are formed.

The connecting wall section 54 connects the upper side wall section 48 and one of the restricting plates 82, together with covering an end portion of the light guide 34 laterally. Consequently, when the lighting device 200 is mounted in the attachment structure 10, it is possible to prevent damage to the light guide 34 by manual contact with the light guide 34 or other components, etc.

Next, an installation procedure for the lighting device 200 with respect to the curved surface 36 of the door arm rest 22 will be described, using the attachment structure 10 which is configured in the foregoing manner.

In the case of attaching the lighting device 200 with respect to the curved surface 36 of the door arm rest 22, at first, the lighting device 200 is advanced toward the pedestal 40, in a state in which the connector 206 is placed in facing relation to the base section 44, and the connecting member 204 coincides with the distal end position of the light guide 34. When this is done, the front surface of the connector 206 contacts the tapered surface 68 of the engagement claw 58.

Subsequently, when the lighting device 200 is pressed toward the base section 44, the supporting wall section 60 is deformed elastically so that the engagement claw 58 is displaced in a direction away from the side wall section 56, and the connector 206 enters between the side wall section 56 and the engagement claw 58. In addition, when the lighting device 200 is pressed further toward the base section 44, the engagement claw 58, which has overcome and surpassed the connector 206, is restored to its original position and contacts the back surface of the connector 206, and an end of the light guide 34 is mounted in the inner hole of the connecting member 204.

At this time, the front surface of the connector 206 contacts the respective distal end surfaces of the first through third protrusions 70, 72, 74. More specifically, in a state in which the front surface of the connector 206 contacts the respective distal end surfaces of the first through third protrusions 70, 72, 74, the back surface thereof contacts the engagement claw 58, and therefore the connector 206 is fixed with respect to the base section 44.

Further, one side surface of the connector 206 is placed in surface contact with the side wall section 56, and another side surface of the connector 206 is placed in line contact with the projection 64 together with contacting the wall portion 78. As a result, looseness and chattering of the connector 206 with respect to the base section 44 is suppressed. Furthermore, the front surface of the lighting unit 208 contacts the distal end surface of the fourth protrusion 76, and another side surface of the lighting unit 208 contacts the wall portion 80. As a result, looseness and chattering of the lighting unit 208 with respect to the base section 44 is suppressed.

Further still, one of the flanges 210 of the connector 206 is placed in contact with a wall surface of the side wall section 56, whereas the other flange 212 of the connector 206 is placed in contact with the engagement claw 58. Therefore, movement of the lighting device 200 in a vertical downward direction (Z1 direction) with respect to the base section 44 is restricted. More specifically, the side wall section 56 and the engagement claw 58 function as movement restricting means for restricting vertical downward movement of the lighting device 200. However, in a state in which the lighting device 200 has been mounted on the attachment structure 10, the flange 210 may remain out of contact with the side wall section 56, and the flange 212 may remain out of contact with the engagement claw 58. In this case as well, vertical downward movement of the lighting device 200 can be restricted.

Further, since the upper surface of the lighting unit 208 is in contact with the respective upper restricting surfaces 82a, 84a, vertical upward movement (in the Z2 direction) of the lighting device 200, which is fixed to the base section 44, is restricted. Therefore, vertical upward movement of the lighting device 200 with respect to the base section 44, and exertion of an excessive force on the light guide 34 can be prevented. However, in a state in which the lighting device 200 has been mounted on the attachment structure 10, the respective upper restricting surfaces 82a, 84a may remain out of contact with the upper surface of the lighting unit 208. In this case as well, since the amount of vertical upward movement of the lighting device 200 with respect to the base section 44 can be suppressed to a small amount, exertion of an excessive force on the light guide 34 can be prevented.

Furthermore, since the front surface of the lighting unit 208 is in contact with the respective frontward restrictive surfaces 82b, 84b, frontward movement of the lighting unit 208 is restricted. Therefore, frontward movement of the lighting unit 208 with respect to the base section 44, and exertion of an excessive force on the light guide 34 can be prevented. However, in a state in which the lighting device 200 has been mounted on the attachment structure 10, the respective frontward restricting surfaces 82b, 84b may remain out of contact with the front surface of the lighting unit 208. In this case as well, since the amount of frontward movement of the lighting device 200 with respect to the base section 44 can be suppressed to a small amount, exertion of an excessive force on the light guide 34 can be prevented.

Further still, the connecting member 204 is positioned vertically upward (in the Z2 direction) from the upper side wall section 48, together with the claw member 216 of the lighting unit 208 being positioned vertically above the wall portion 80. Consequently, even in the case that the lighting device 200 is moved in a vertical downward direction (Z1 direction) with respect to the base section 44, since the connecting member 204 contacts the upper side wall section 48 and the claw member 216 contacts the wall portion 80, such vertical downward movement of the lighting device 200 is restricted. More specifically, the upper side wall section 48 and the wall portion 80 function as movement restricting means for restricting vertical downward movement of the lighting device 200.

As has been described above, by the attachment structure 10 for the lighting device 200 according to the present invention, the lighting device 200 can be fixed by the attachment member 42 with respect to the flat plate-shaped base section 44 of the pedestal 40, which is provided on the curved surface 36 of the door arm rest 22 (door lining 12). Accordingly, without using screw members, the lighting device 200 can be attached stably with respect to the curved surface 36 of the door arm rest 22. Thus, the number of attachment steps required for the lighting device 200 can be reduced.

Further, due to one of the flanges 210 of the connector 206 being placed in contact with the side wall section 56, and the other flange 212 of the connector 206 being placed in contact with the engagement claw 58, vertical downward movement of the lighting device 200 with respect to the base section 44 is restricted. Furthermore, by positioning the upper side wall section 48 vertically downward from the connecting member 204, and positioning the wall portion 80 vertically downward from the other claw member 216 that is formed on the lighting unit 208, vertical downward movement of the lighting device 200 with respect to the base section 44 is restricted. More specifically, according to the present embodiment, although the base section 44 extends in a vertical direction, since vertical downward movement of the lighting device 200 with respect to the base section 44 is restricted by the pedestal 40 and the attachment member 42, the lighting device 200 can be fixed to the base section 44.

According to the present embodiment, since the engagement claw 58 restricts movement of the lighting device 200 in a direction away from the base section 44, the lighting device 200 can be fixed stably with respect to the base section 44.

Further, one side surface of the connector 206 is in surface contact with the side wall section 56, and another side surface of the connector 206 is in line contact with the projection 64 provided on the supporting wall section 60. As a result, the lighting device 200 can be fixed in a more stable manner with respect to the base section 44. Furthermore, compared to a case in which both side surfaces of the connector 206 are in surface contact with the attachment member 42, looseness or chattering of the lighting device 200 with respect to the base section 44 can be suppressed without requiring an increase in the dimensional precision of the lighting device 200 and the attachment structure 10.

According to the present embodiment, since the projection 64, the transverse cross section of which is formed in an arcuate shape, extends along the direction of extension of the supporting wall section 60, the projection 64 can be placed in line contact with respect to the other side surface of the connector 206.

Further, since the lengthwise dimension of the projection 64 is shorter than the lengthwise dimension of the supporting wall section 60, compared to a situation in which the projection 64 were formed to span over the entire length of the supporting wall section 60, the supporting wall section 60 can easily be bent. Consequently, the lighting device 200 can be mounted easily with respect to the attachment member 42, by bending the supporting wall section 60 and displacing the engagement claw 58 toward a side that is opposite to the side where the side wall section 56 is positioned.

Furthermore, since the widthwise dimension of the projection 64 is shorter than the widthwise dimension of the supporting wall section 60, compared to a situation in which the projection 64 were formed to span over the entire width of the supporting wall section 60, the supporting wall section 60 can easily be bent. Consequently, the lighting device 200 can easily be mounted with respect to the attachment member 42.

According to the present embodiment, a draft angle of a predetermined angle θ is set on the contact surface of the side wall section 56 with the connector 206, and the supporting wall section 60 is erected on the base section 44 while being inclined toward the side wall section 56 at the predetermined angle θ, which is substantially the same as the draft angle, with respect to a line P perpendicular to the plane of the base section 44. As a result, looseness and chattering of the lighting device 200 with respect to the base section 44 can be suppressed.

Further, the contact surfaces of the first through fourth protrusions 70, 72, 74, 76 that are in contact with the lighting device 200 are inclined with respect to a flat surface of the base section 44 toward the side of the side wall section 56 (the base section 44), at an angle that is substantially the same as the draft angle of the side wall section 56. As a result, looseness and chattering of the lighting device 200 with respect to the base section 44 can be suppressed.

Figure 8:
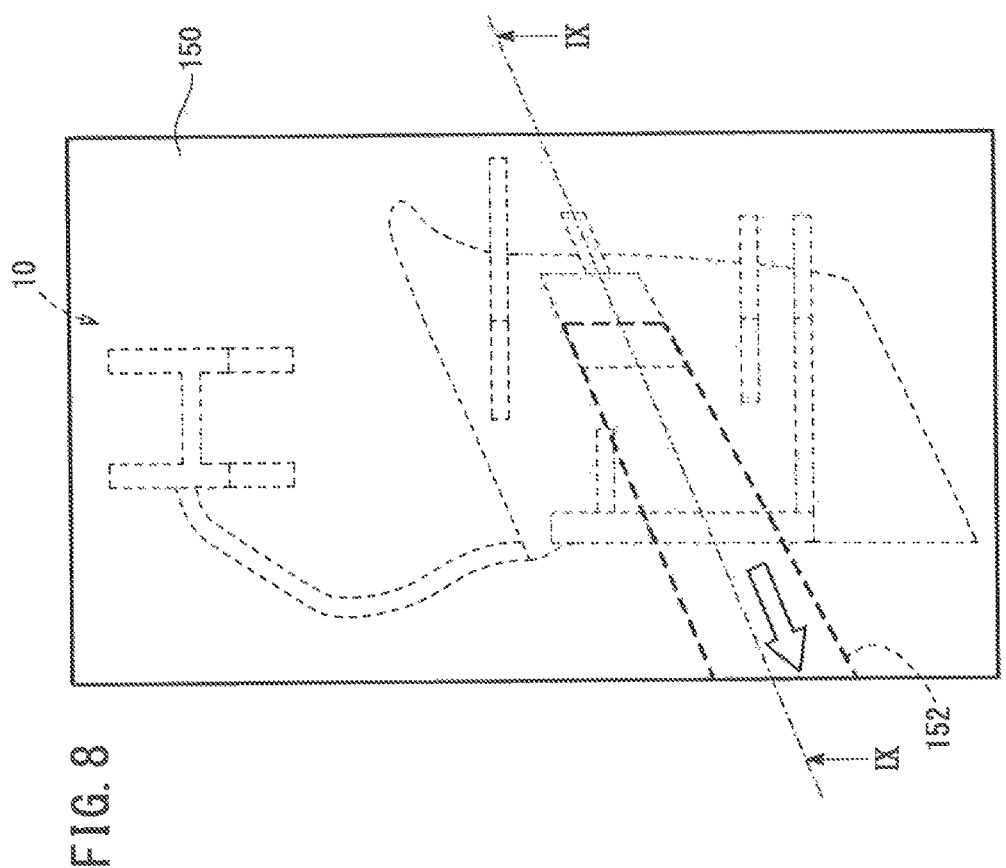
FIG. 8 is a schematic view for describing a mold for forming the attachment structure.
Figure 9:
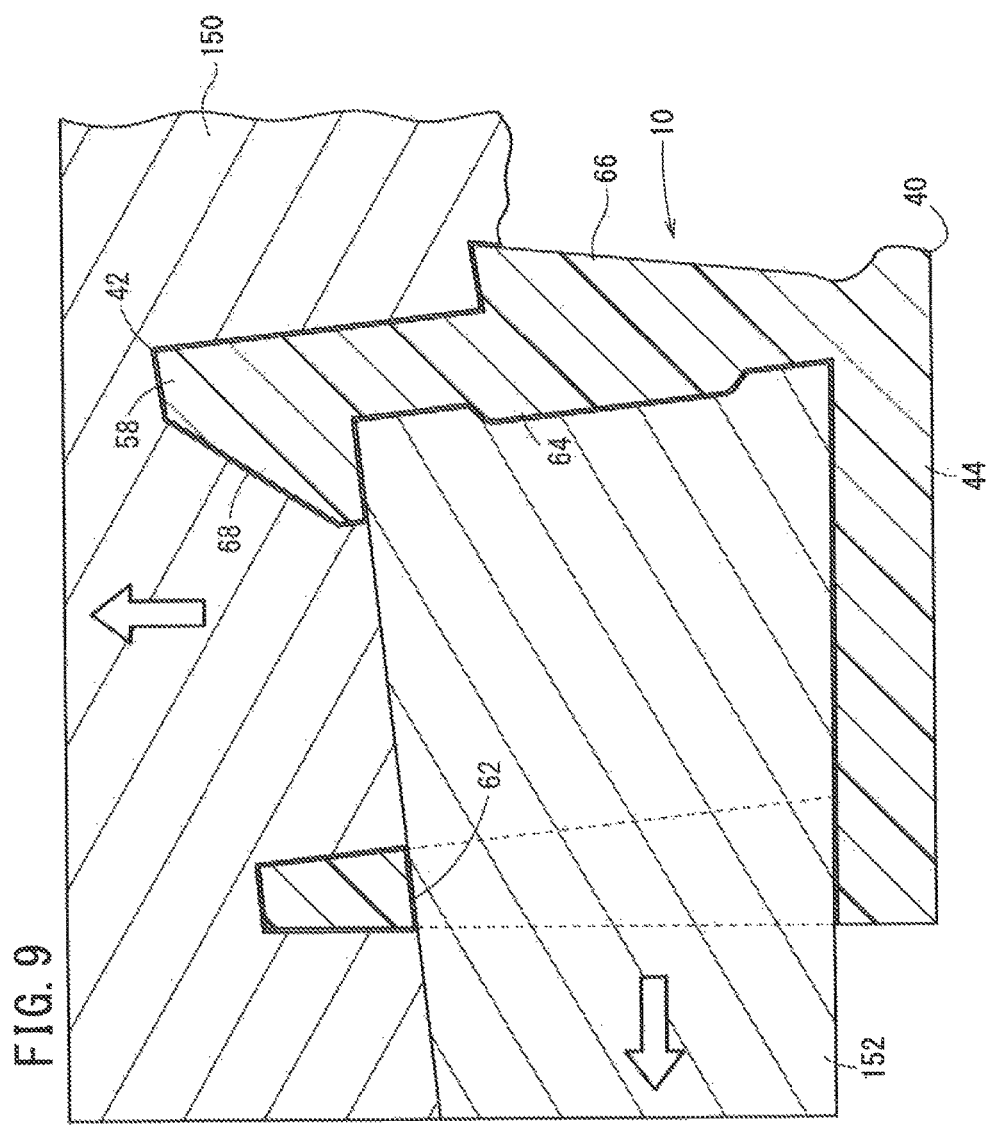
FIG. 9 is a cross-sectional view with partial omission taken along line IX-IX of FIG. 8.
Figure 10:
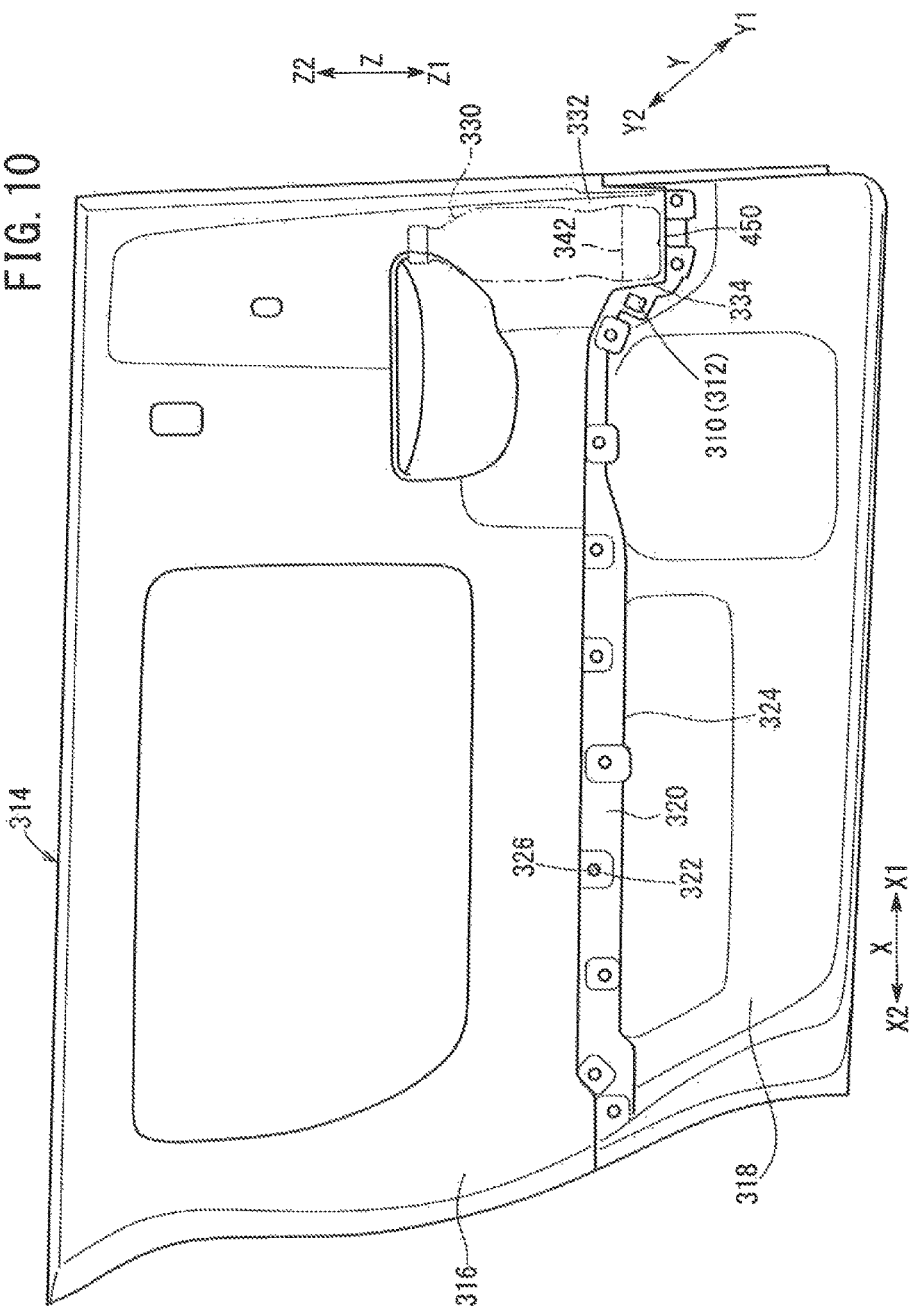
FIG. 10 is a perspective view of a door lining to which there is applied an attachment structure for a lighting device according to a second embodiment of the present invention.
Figure 11:
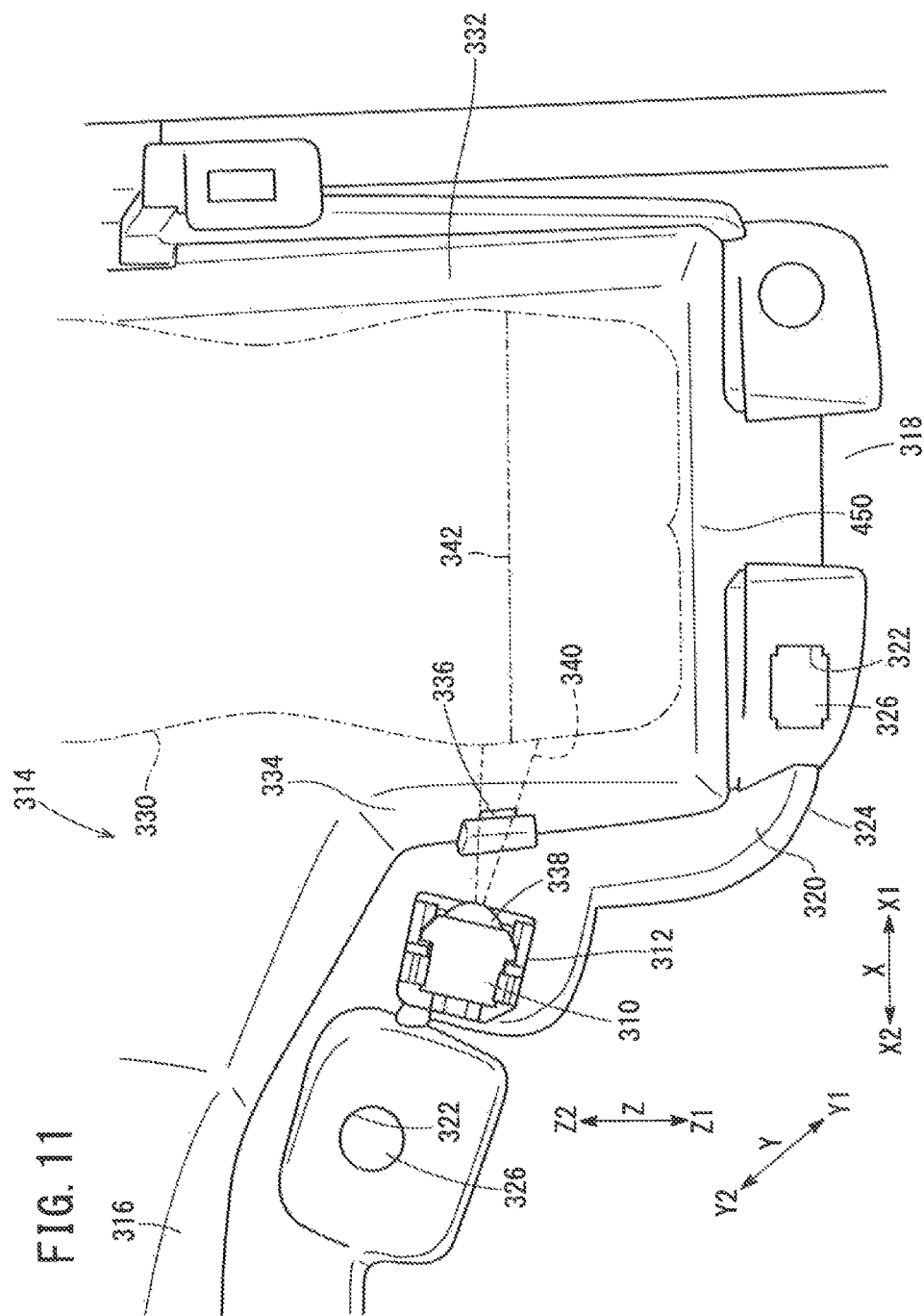
FIG. 11 is a perspective view in which an arrangement location of the lighting device and the attachment structure on the door lining is shown at an enlarged scale.
Figure 12:
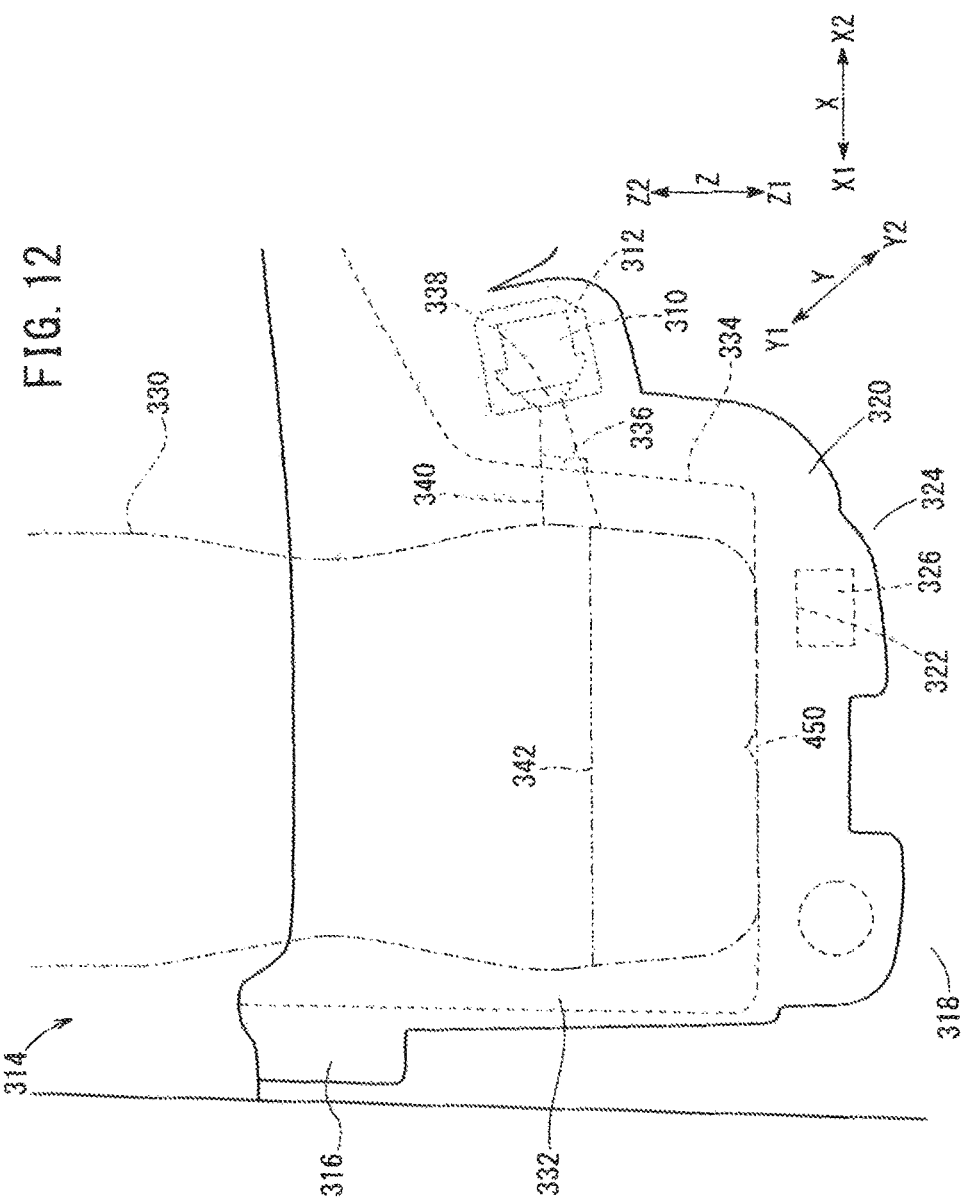
FIG. 12 is a perspective view in which an arrangement location of the lighting device and the attachment structure with respect to a beverage container accommodated in a drink holder is shown at an enlarged scale.

Furthermore, the die-cut hole 62 is formed in the side wall section 56 at a location facing the supporting wall section 60. In this case, as shown in FIGS. 8 and 9, the engagement claw 58 can easily be formed using a mold 150 and a slide mold 152 that is passed through the die-cut hole 62.

According to the present embodiment, since the pedestal 40 includes the upper side wall section 48 that is disposed integrally with an upper end of the base section 44 and the curved surface 36 of the door arm rest 22, the rigidity of the pedestal 40 can be increased. Therefore, the lighting device 200 can be attached more stably with respect to the curved surface 36 of the door arm rest 22. Further, by the upper side wall section 48, which is comparatively high in rigidity, vertical downward movement of the lighting device 200 relative to the base section 44 can be restricted.

Furthermore, since the pedestal 40 includes the lower side wall section 46 that is disposed integrally with a lower end of the base section 44 and the curved surface 36 of the door arm rest 22, the rigidity of the pedestal 40 can be further increased.

According to the present embodiment, since vertical upward movement of the lighting device 200 relative to the base section 44 is restricted by the respective upper restricting surfaces 82a, 84a that make up the movement restricting member 52, the lighting device 200 can be attached more stably to the curved surface 36 of the door arm rest 22.

Second Embodiment

[Outline Configuration of the Present Embodiment]

An attachment structure 312 for a lighting device 310 according to a second embodiment of the present invention, for example as shown in FIGS. 10 through 16, is applied to a door lining 314 that is attached to a vehicle compartment interior side of a door panel of the vehicle. However, the attachment structure 312 is not limited to the described embodiment. Interior members of the vehicle apart from the door lining 314, or other objects apart from interior members may serve as attachment objects, and it is possible for the lighting device 310 to be attached to such attachment objects. In the description that follows, a case will be described in which the lighting device 310 is attached through the attachment structure 312 to the door lining 314 of a rear door of the vehicle.

The door lining 314, which is made from plastic or the like, is constituted from an upper member 316, and a lower member 318 that is assembled on the upper member 316. More specifically, plural holes 322 are formed along forward and rearward directions (the directions of the arrow X) on a lower end part 320 of the upper member 316. Consequently, in a state in which the lower end part 320 of the upper member 316, and an upper end part 324 of the lower member 318 are overlapped, engagement members 326 such as bolts or the like are engaged through the holes 322, whereby the upper member 316 and the lower member 318 are connected and the door lining 314 is constructed.

Within the upper member 316, a vehicle forward location (in the X1 direction) extends downwardly (in the direction of the arrow Z1) more so than other locations thereof. In addition, in the aforementioned vehicle forward location, a drink holder 332 is formed, in which a beverage container 330 (illuminated object) having optical transparency such as a PET bottle or the like can be accommodated. The drink holder 332 is formed by a location in the vehicle forward direction of the upper member 316 being recessed in the direction of the arrow Y1, thereby forming a pocket shape in which the beverage container 330 can be accommodated.

In the drink holder 332, within the lower side portion thereof that extends in the direction of the arrow Z1, a hole 336 is formed in a side wall 334 in the rearward direction of the vehicle (in the direction of the arrow X2). In addition, within the lower end part 320 of the upper member 316, the attachment structure 312 is formed integrally with the lower end part 320 at a location in the vicinity of the side wall 334. More specifically, the attachment structure 312 is constituted from the same material as the upper member 316, and is formed to extend from the lower end part 320 in the direction of the arrow Y1, so as to face the hole 336. Consequently, in the case that the lighting device 310 is attached to the attachment structure 312, the lighting device 310 is arranged so as to extend in the direction of the arrow Y1 and to face the hole 336.

In this case, it is possible for the lighting device 310 to externally radiate or shine illuminating light 340 through a lens 338. As shown in FIGS. 11 through 14, the lighting device 310 is attached to the attachment structure 312 such that the lens 338 and the hole 336 face one another.

Consequently, in the event that illuminating light 340 is output through the lens 338 from the lighting device 310 that is attached to the attachment structure 312, the illuminating light 340 passes through the hole 336 and the beverage container 330 is illuminated thereby. The beverage container 330 is a container having optical transparency, and therefore, in the event that illuminating light 340 is applied to beverage 342 in the interior of the beverage container 330, the illuminating light 340 is reflected into the vehicle compartment from the beverage container 330 as reflected light. Consequently, by a passenger inside the vehicle compartment viewing the reflected light, it can be confirmed that the beverage 342 exists inside the beverage container 330.

[Detailed Configuration of the Present Embodiment]

Detailed configurations of the attachment structure 312 and the lighting device 310 according to the present embodiment will now be described with reference to FIGS. 17 through 22. In the following description, as necessary, reference may also be made to FIGS. 10 through 16. Further, the arrow A directions, the arrow B directions, and the arrow C directions shown in FIGS. 17 through 22 are three axial directions, which are shown for the purpose of clarifying the positional relationship between the attachment structure 312 and the lighting device 310. In accordance with the arrangement locations of the attachment structure 312 and the lighting device 310 with respect to the door lining 314, situations exist in which the three axial directions do not correspond with the three axial directions of the arrow X directions, the arrow Y directions, and the arrow Z directions shown in FIGS. 10 through 16.

The lighting device 310 and the attachment structure 312, respectively, include laterally symmetrical structures with respect to center portions thereof along the directions of the arrow A.

First, the lighting device 310 will be described.

Figure 17:
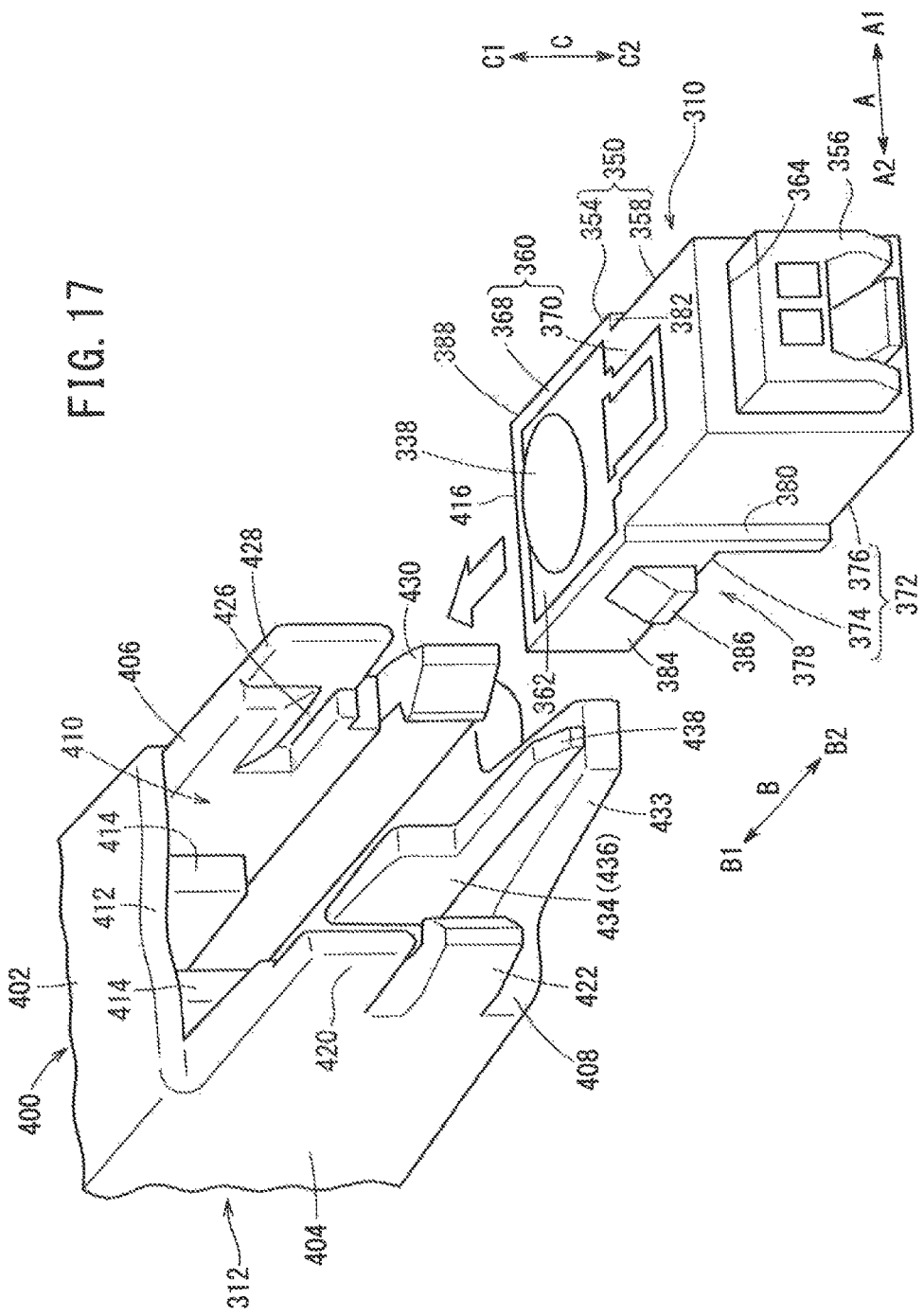
FIG. 17 is a perspective view illustrating insertion of the lighting device in the attachment structure.
Figure 18:
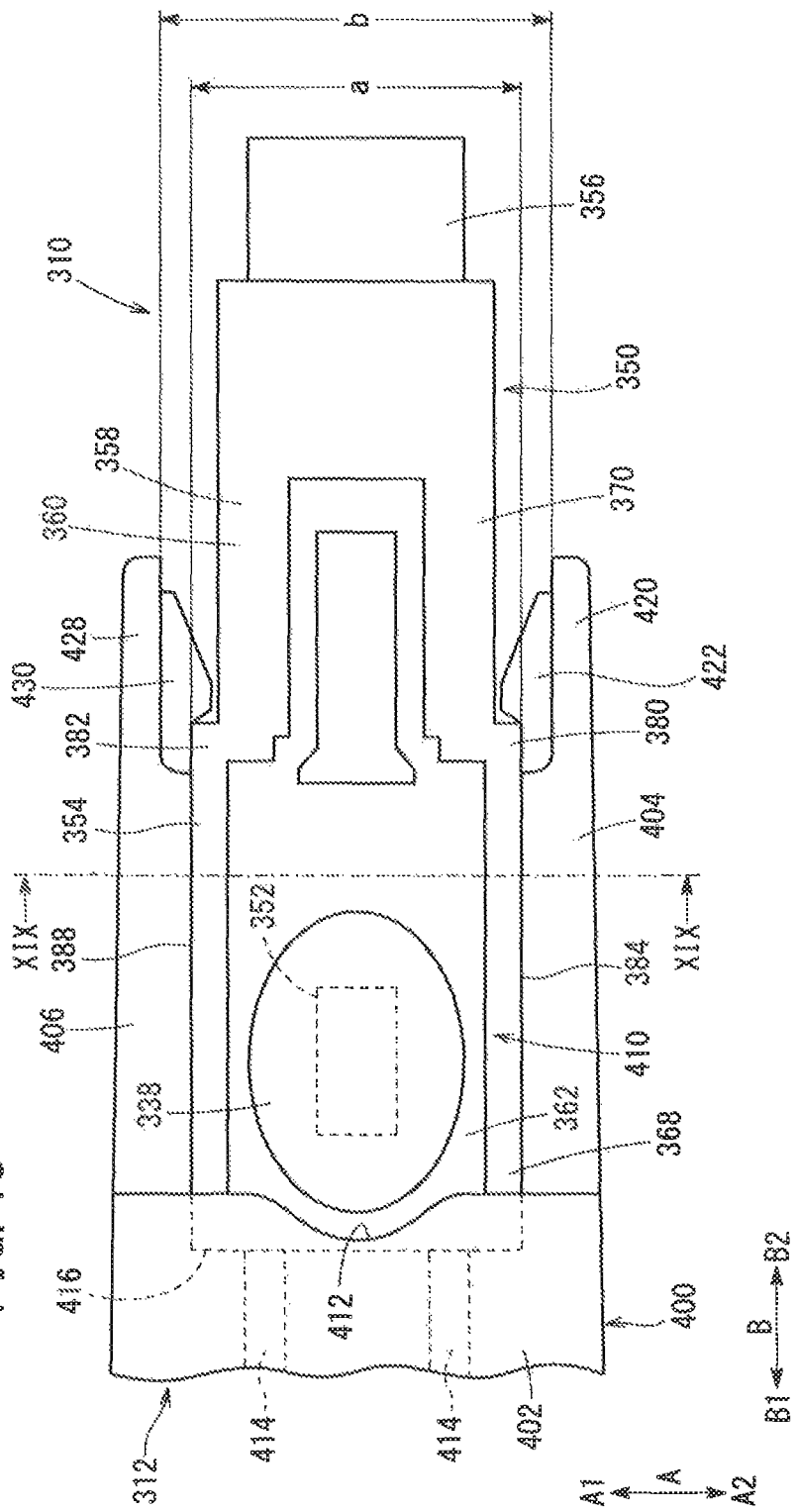
FIG. 18 is a plan view showing an inserted condition of the lighting device in the attachment structure.

The lighting device 310 includes a casing 350 made of plastic. The casing 350 is constituted from a light source accommodating unit 354 in which a light source 352 such as an LED (Light Emitting Diode) or the like is accommodated and the lens 338 is provided, and a connector fitting section 358, which is contiguous to the light source accommodating unit 354 and is fitted into a connector 356. In this case, as shown in FIGS. 17 and 18, in a state in which the light source accommodating unit 354 is oriented in the direction of the arrow B1, and the connector fitting section 358 is oriented in the direction of the arrow B2, by the lighting device 310 being inserted in the direction of the arrow B1 with respect to the attachment structure 312, the lighting device 310 can be attached to the attachment structure 312.

A substantially T-shaped cover member 362 made of plastic is installed on an upper surface 360 (a side surface in the direction of the arrow C1) of the casing 350. The lens 338 is formed at a location on the cover member 362 on the side of the light source accommodating unit 354. The light source 352 is arranged at a location directly beneath the lens 338 in the interior of the light source accommodating unit 354. More specifically, both the light source 352 and the lens 338 are disposed in a condition that coincides substantially with the optical axis.

The light source 352 emits illuminating light 340 responsive to supply of electrical power from a non-illustrated vehicle battery through the connector 356. The lens 338 focuses the illuminating light 340 that is emitted from the light source 352, and is a biconvex lens thorough which light is irradiated or diverged toward the exterior. The type and shape of the lens 338 can be set appropriately.

The light source accommodating unit 354 is a rectangular block having a size sufficient to enable the light source 352 to be accommodated and the lens 338 to be disposed therein. On the other hand, the connector fitting section 358 is a rectangular block having a hole 364 therein into which the connector 356 is fitted.

In this case the thickness of the light source accommodating unit 354 in the directions of the arrow C is thinner than the thickness of the connector fitting section 358. Further, the width of the light source accommodating unit 354 in the directions of the arrow A is slightly wider than the width of the connector fitting section 358.

Figure 13:
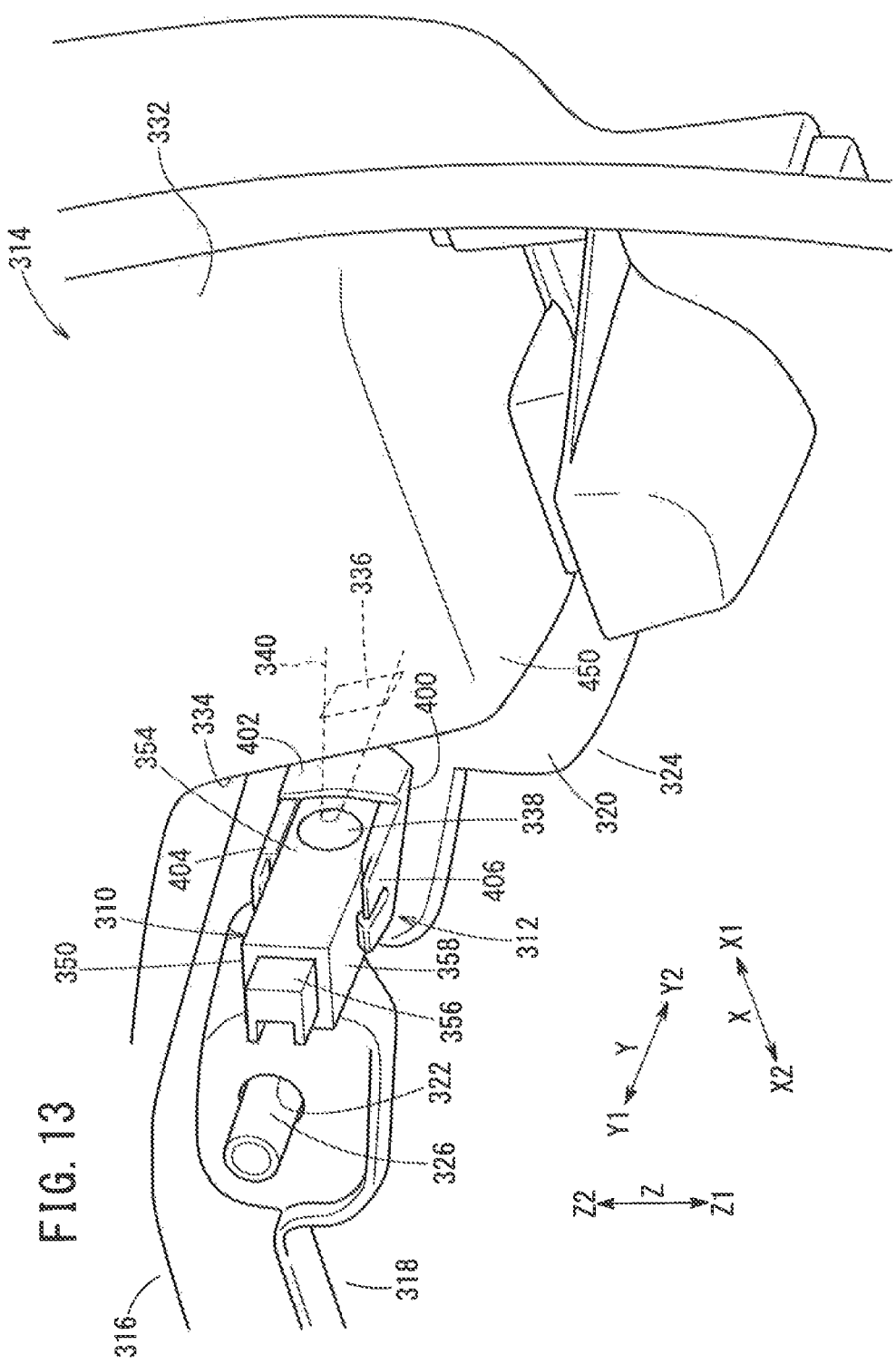
FIG. 13 is an enlarged perspective view showing an attached state of the lighting device on the attachment structure.
Figure 14:
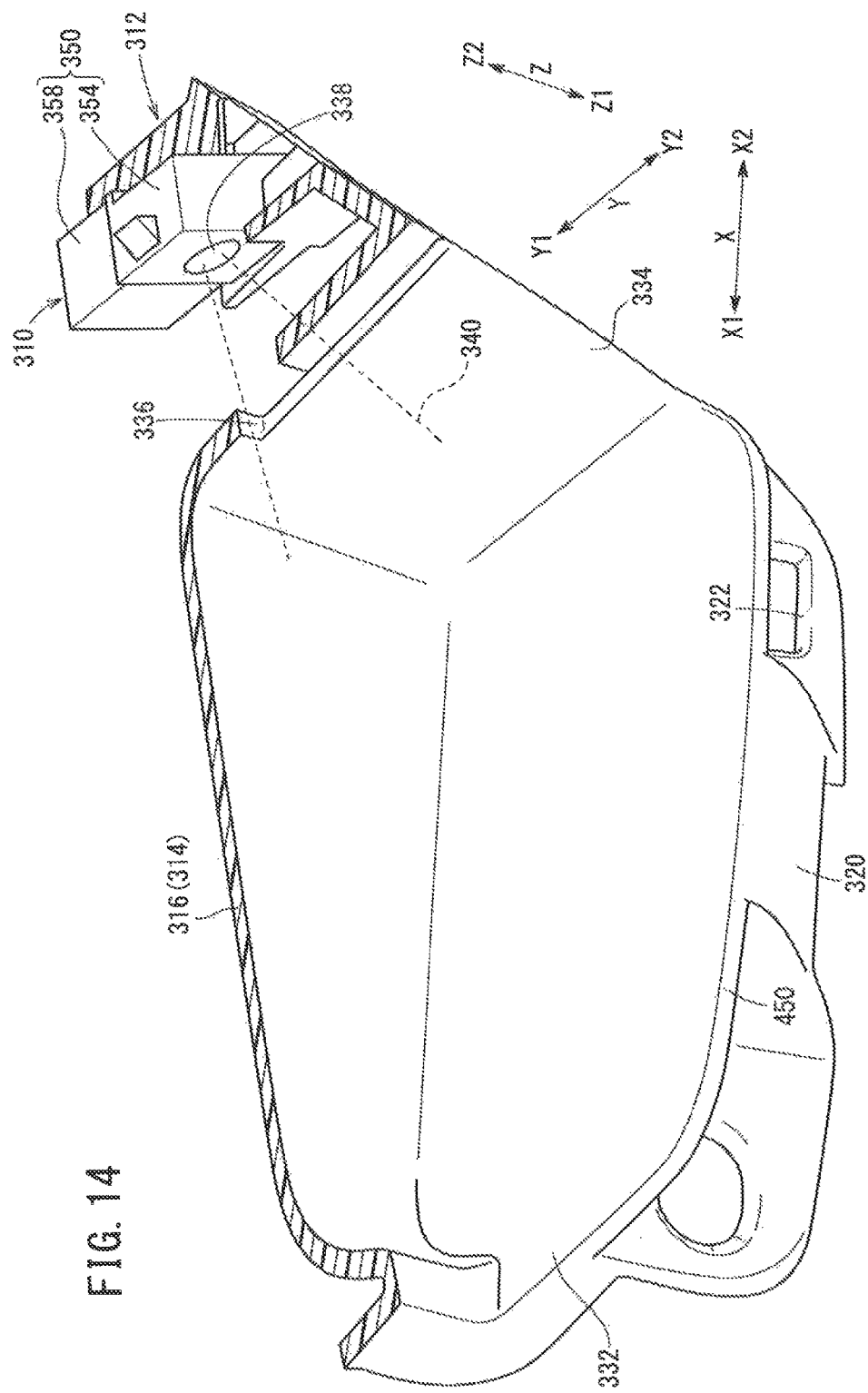
FIG. 14 is an enlarged perspective view in which the drink holder and the attachment structure are shown in cutaway.
Figure 15:
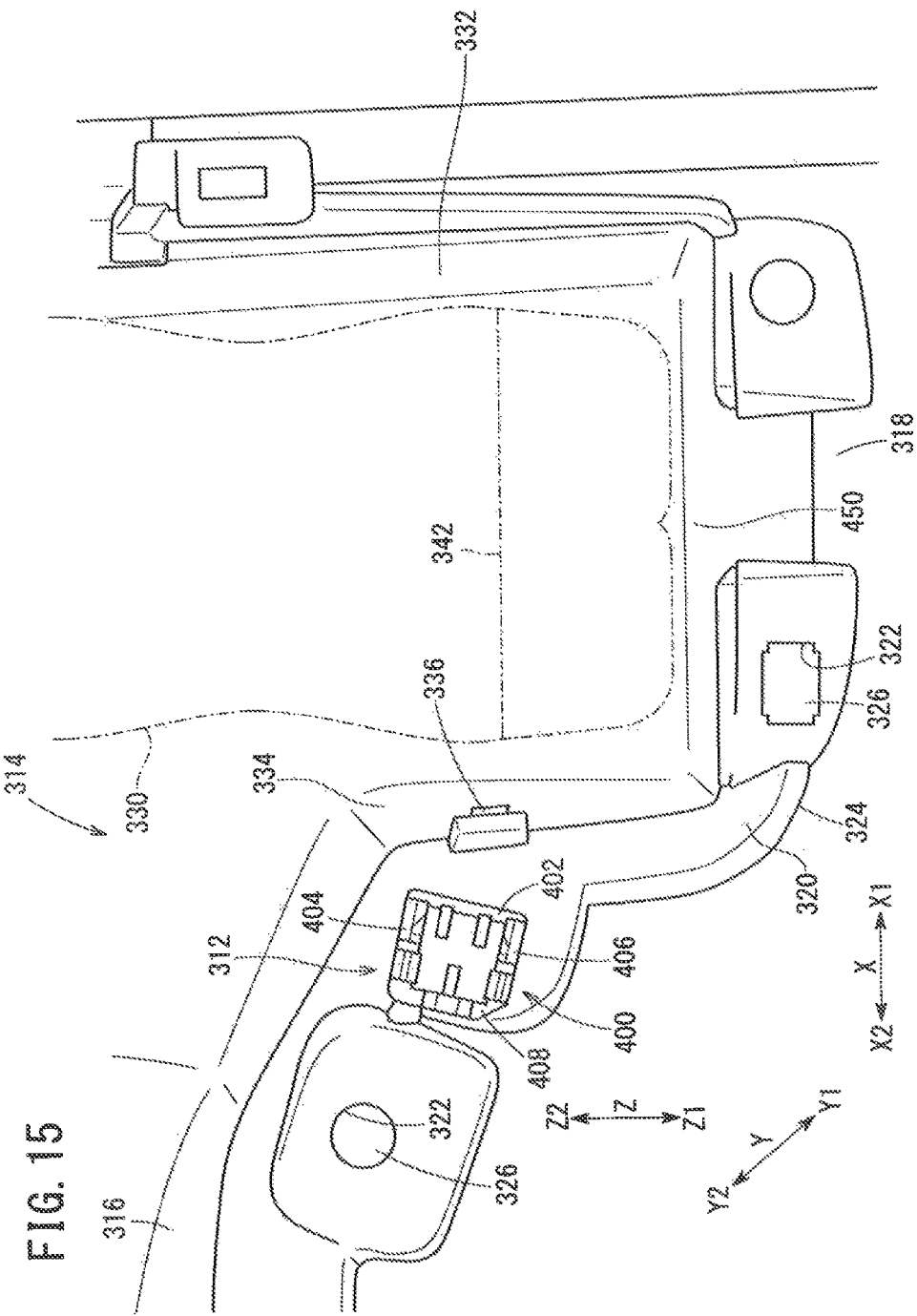
FIG. 15 is an enlarged perspective view showing a state in which the lighting device is removed from the attachment structure.
Figure 16:
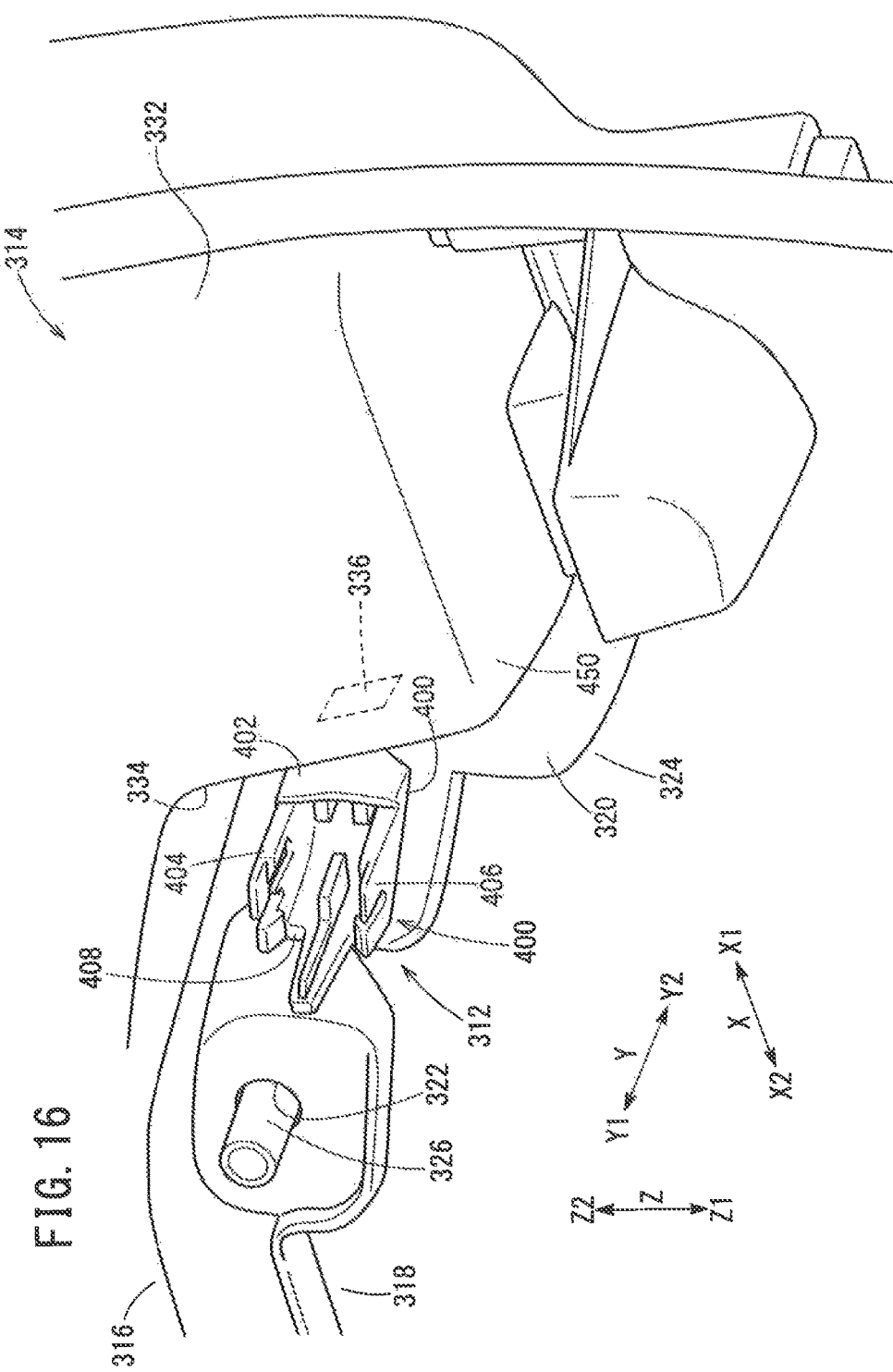
FIG. 16 is an enlarged perspective view showing a state in which the lighting device is removed from the attachment structure.

As shown in FIGS. 13, 14, and 17, an upper surface 368 of the light source accommodating unit 354 that makes up the upper surface 360 (one side surface) of the casing 350, and an upper surface 370 of the connector fitting section 358 are substantially flush with each other. Therefore, a bottom surface 374 of the light source accommodating unit 354, and a bottom surface 376 of the connector fitting section 358, both of which make up a bottom surface 372 of the casing 350, are set to different heights mutually along the directions of the arrow C.

By the light source accommodating unit 354 and the connector fitting section 358, which differ in thickness, on the casing 350, a stepped part 378 is constituted by the bottom surface 374 of the light source accommodating unit 354, the side surface in the direction of the arrow B1 of the connector fitting section 358, and the bottom surface 376 of the connector fitting section 358. More specifically, the stepped part 378 is a step that is formed at the connecting portion between the light source accommodating unit 354 and the connector fitting section 358, on the bottom surface 372 side of the casing 350.

Further, on corners 380, 382 of the light source accommodating unit 354 on the side of the connector fitting section 358 (in the direction of the arrow B2), the corner 380 in the arrow A2 direction bulges in the direction of the arrow A2 from the connector fitting section 358, whereas the corner 382 in the A1 direction bulges in the direction of the arrow A1 from the connector fitting section 358.

Furthermore, a claw member 386 (projection) that projects in a convex shape in the direction of the arrow A2 is formed on a side surface 384 in the direction of the arrow A2, contiguous with the corner 380 of the light source accommodating unit 354. On the other hand, a claw member 390 (projection) that projects in a convex shape in the direction of the arrow A1 is formed on a side surface 388 in the direction of the arrow A1, contiguous with the corner 382 of the light source accommodating unit 354. In addition, the claw members 386, 390 are formed at positions of substantially the same height in the directions of the arrow C, and upper portions of each of the claw members 386, 390 are formed in tapered shapes.

Next, the attachment structure 312 will be described.

As shown in FIGS. 11, 13 through 18, 20, and 22, at a position facing the hole 336 on the lower end part 320 of the upper member 316, the attachment structure 312 includes a tubular shaped main body portion 400 that extends from the lower end part 320 in the direction of the arrow Y1 and the direction of the arrow B2. The tubular shaped main body portion 400 has a laterally symmetrical shape with respect to a center portion thereof along the directions of the arrow A, and is formed in a rectangular cylindrical shape that matches the shape of the casing 350 constituting the lighting device 310.

More specifically, the tubular shaped main body portion 400 includes an upper wall section 402 (side surface)

oriented in the direction of the arrow C1, a side wall section 404 oriented in the direction of the arrow A2, a side wall section 406 oriented in the direction of the arrow A1, and a bottom wall section 408 (connecting member) oriented in the direction of the arrow C2. The upper wall section 402 and the bottom wall section 408 are connected by the two side wall sections 404, 406, thereby forming a space in which the casing 350 of the lighting device 310, which is inserted in the direction of the arrow B1, can be received.

A location on the upper wall section 402 is cutout significantly in the direction of the arrow B2, and is formed as an opening 410 that opens continuously along the directions of the arrow B. Therefore, compared to the two side wall sections 404, 406 and the bottom wall section 408, the upper wall section 402 is formed in a largely retracted shape in the direction of the arrow Y2 and the direction of the arrow B1.

On a side in the direction of the arrow B2 of the upper wall section 402, an arcuately shaped recess 412 is formed, which is recessed in the direction of the arrow B1 matching with the shape of the lens 338. Further, on the bottom surface (inwardly of the tubular shaped main body portion 400) of the upper wall section 402, two pressing parts 414 (distal end pressing parts) extend in the directions of the arrow B.

Therefore, in the case that the casing 350 is inserted into the tubular shaped main body portion 400 along the direction of the arrow B1, the lens 338 is exposed outwardly, and the lighting device 310 can be attached to the attachment structure 312 without the lens 338 coming into contact with any constituent elements of the attachment structure 312. Further, by the two pressing parts 414 abutting against a side surface 416 (distal end portion) in the direction of the arrow B1 of the light source accommodating unit 354, the lighting device 310 can be positioned at a predetermined position in the tubular shaped main body portion 400 along the directions of the arrow B. Stated otherwise, the two pressing parts 414 function as stoppers with respect to the light source accommodating unit 354 that has been inserted into the tubular shaped main body portion 400.

As noted below, the two side wall sections 404, 406, which face one another in the directions of the arrow A, have substantially the same structure.

Figure 19:
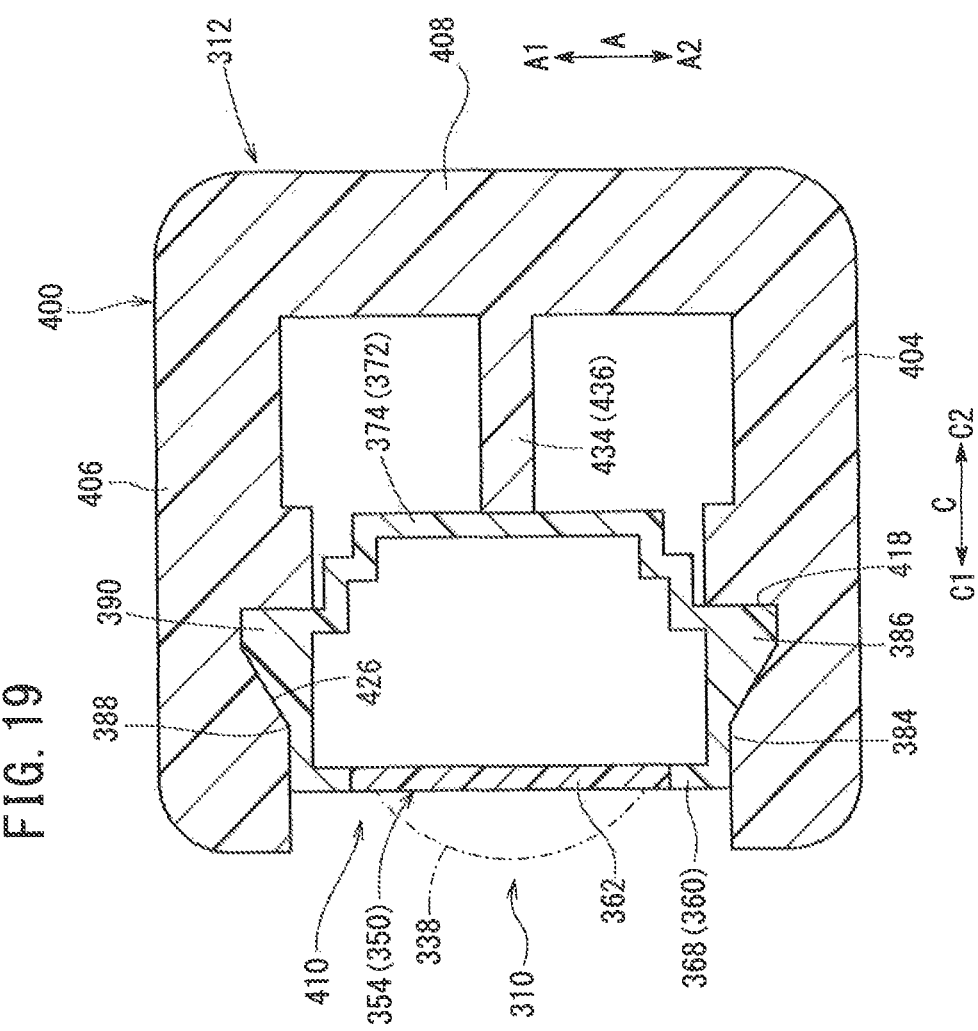
FIG. 19 is a cross-sectional view with partial omission taken along line XIX-XIX of FIG. 18.

At first, on a side surface in the direction of the arrow A1 of the side wall section 404 (a side surface facing the side wall section 406, i.e., an inner side surface of the tubular shaped main body portion 400), a fitting groove 418 is formed along the directions of the arrow B, which is capable of being fitted with the claw member 386 of the light source accommodating unit 354. Therefore, as shown in FIG. 19, the fitting groove 418 matches with the shape of the claw member 386, and is formed with a tapered shape in cross section.

Further, at a location on the side of the fitting groove 418 on a distal end part in the direction of the arrow B2 of the side wall section 404, a thin-walled portion 420 is formed that extends along the direction of the arrow B2. The thickness in the directions of the arrow A of the thin-walled portion 420 is set to be thinner than the thickness along the directions of the arrow A of the side wall section 404.

Figure 20:
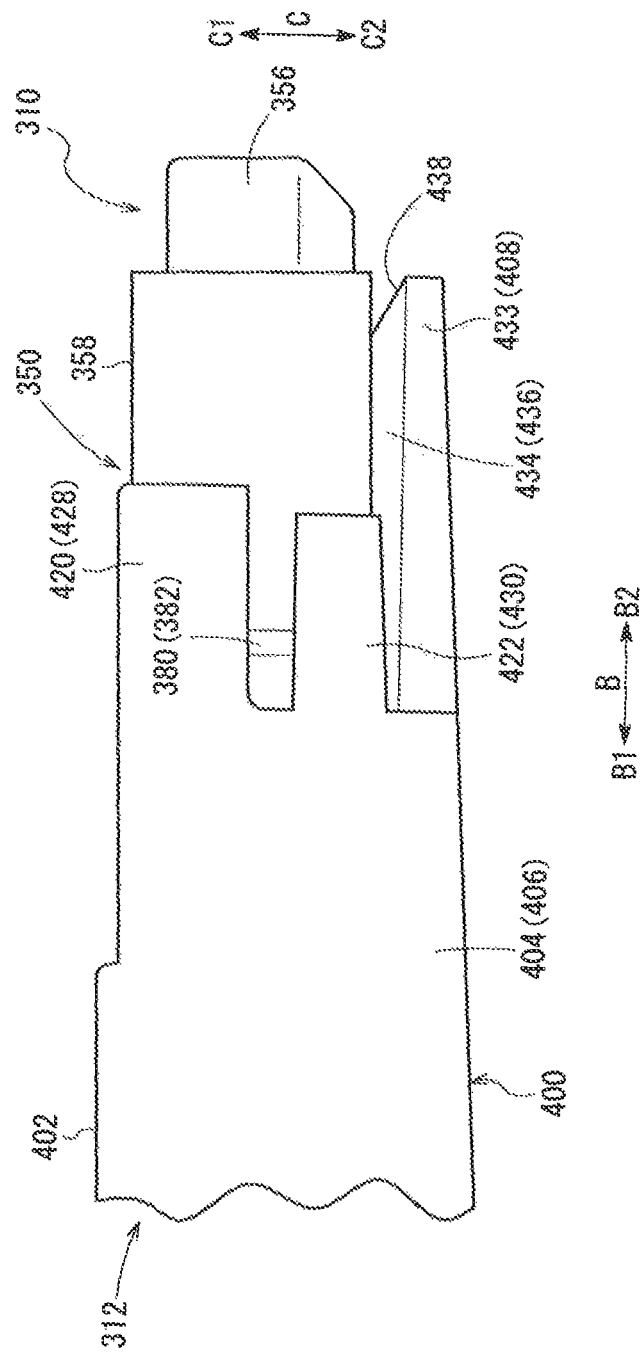
FIG. 20 is a side view showing an inserted condition of the lighting device in the attachment structure.
Figure 21:
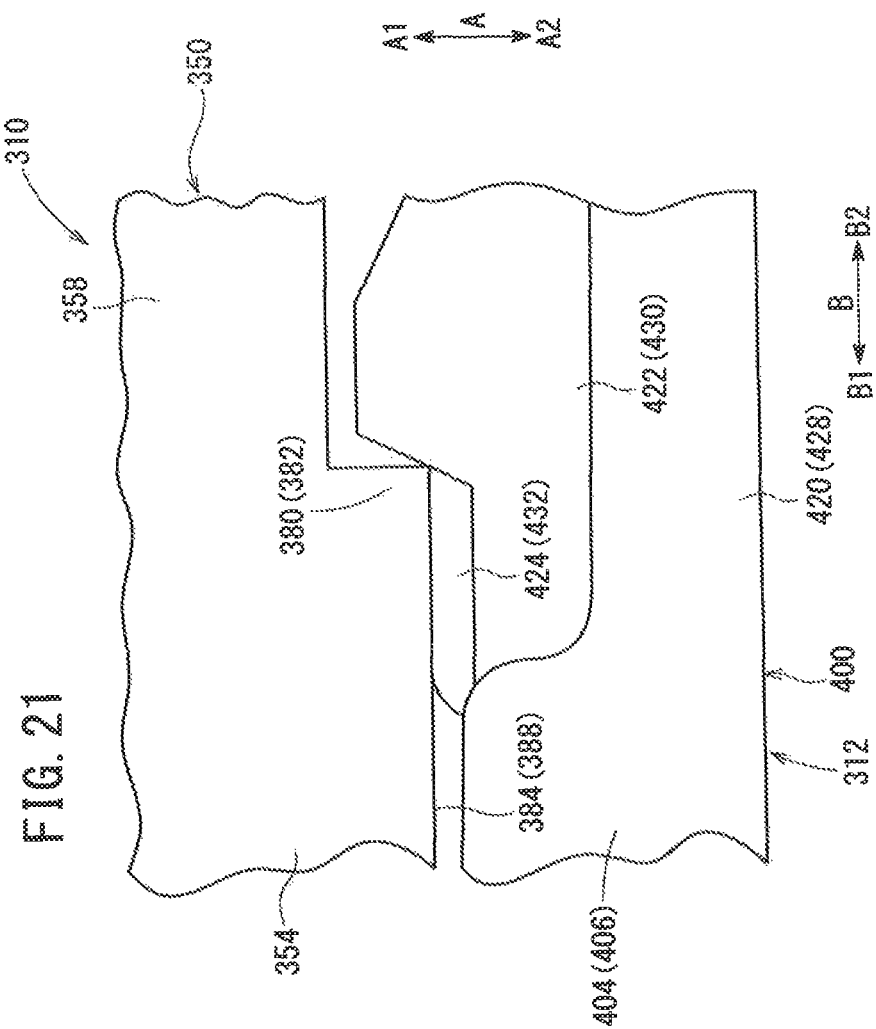
FIG. 21 is an enlarged plan view showing a claw member.
Figure 22:
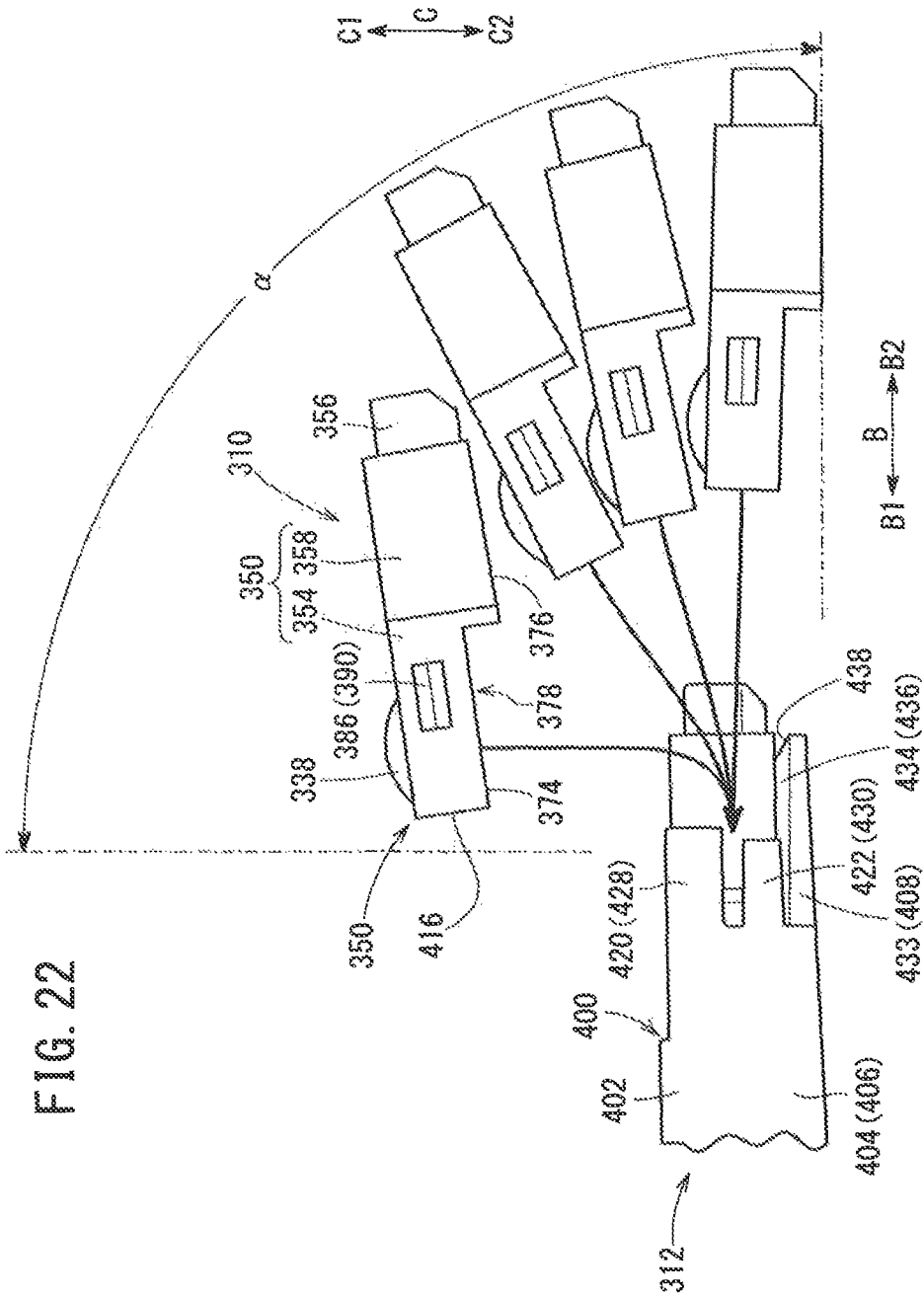
FIG. 22 is an explanatory view showing an attachment trajectory of the lighting device relative to the attachment structure.

Furthermore, downwardly of the thin-walled portion 420 on the distal end of the side wall section 404 in the direction of the arrow B2, a claw part 422 (engagement part, claw member) is formed that extends along the direction of the arrow B2. In this case, as shown in FIGS. 18, 20, and 22, the thin-walled portion 420 extends in the direction of the arrow B2 more than the claw part 422. In addition, in the case that the casing 350 is inserted into the tubular shaped main body portion 400 along the direction of the arrow B1, the claw part 422 engages with the corner 380 in the direction of the arrow A2 of the light source accommodating unit 354, and presses the light source accommodating unit 354 in the direction of the arrow B1, which is the longitudinal direction of the lighting device 310.

Further, at a location of the claw part 422 proximate the side wall section 404, a convexly shaped pressing part 424 (side surface pressing part) is formed, which presses on a location near to the corner 380 on the side surface 384 of the light source accommodating unit 354, when the claw part 422 has engaged with the corner 380 of the light source accommodating unit 354.

On the other hand, on a side surface in the direction of the arrow A2 of the side wall section 406 (a side surface facing the side wall section 404, i.e., an inner side surface of the tubular shaped main body portion 400), a fitting groove 426 is formed along the directions of the arrow B, which is capable of being fitted with the claw member 390 of the light source accommodating unit 354. Accordingly, the fitting groove 426 also matches with the shape of the claw member 390, and is formed with a tapered shape in cross section.

Further, at a location on the side of the fitting groove 426 on a distal end part in the direction of the arrow B2 of the side wall section 406, a thin-walled portion 428 is formed that extends along the direction of the arrow B2. The thickness in the directions of the arrow A of the thin-walled portion 428 is set to be thinner than the thickness along the directions of the arrow A of the side wall section 406.

Furthermore, downwardly of the thin-walled portion 428 on the distal end of the side wall section 406 in the direction of the arrow B2, a claw part 430 (engagement part, claw member) is formed that extends along the direction of the arrow B2. In this case, the thin-walled portion 428 extends in the direction of the arrow B2 more than the claw part 430. In addition, in the case that the casing 350 is inserted into the tubular shaped main body portion 400 along the direction of the arrow B1, the claw part 430 engages with the corner 382 in the direction of the arrow A1 of the light source accommodating unit 354, and presses the light source accommodating unit 354 in the direction of the arrow B1.

Further, at a location of the claw part 430 proximate the side wall section 406, a convexly shaped pressing part 432 (side surface pressing part) is formed, which presses on a location near to the corner 382 on the side surface 388 of the light source accommodating unit 354 in the direction of the arrow A2, when the claw part 430 has engaged with the corner 382 of the light source accommodating unit 354.

As has been noted previously, the claw members 386, 390 are set at substantially the same height in the directions of the arrow C, and therefore, the fitting grooves 418, 426 are set at substantially the same height, and the thin-walled portions 420, 428 also are set at substantially the same height. Further, the claw parts 422, 430 also are set at substantially the same height.

As shown in FIG. 18, an interval "a" between the two side wall sections 404, 406 is set substantially to the same width as the light source accommodating unit 354. Accordingly, in the case that the claw members 386, 390 are fitted respectively into the fitting grooves 418, 426, the side surfaces 384, 388 of the light source accommodating unit 354 are placed in surface contact, respectively, with the side wall sections 404, 406 as shown in FIG. 19. Further, an interval "b" between the thin-walled portions 420, 428 is set to be wider than the interval "a" between the two side wall sections 404, 406 (a<b). More specifically, the location of the opening 410 in the direction of the arrow B2 is of a wide shape.

On the bottom wall section 408 that connects the two side wall sections 404, 406, a center part thereof along the directions of the arrow A is formed as an extension 433 that extends in the direction of the arrow B2.

In addition, a casing support member 434, which spans over the extension 433 from a central portion of the bottom wall section 408, is formed in the directions of the arrow B. At an intermediate portion in the directions of the arrow B on the casing support member 434, a stepped part 436 is formed that corresponds to the stepped part 378 of the casing 350. Further, a distal end part in the direction of the arrow B2 of the casing support member 434 is formed as a guide surface 438, which is inclined to the direction of the arrow B2 and the direction of the arrow C2.

Therefore, in the case that the casing 350 is inserted into the tubular shaped main body portion 400 in the direction of the arrow B1, the stepped part 378 of the casing 350 is guided by the casing support member 434 along the guide surface 438, such that when the stepped part 378 abuts against the stepped part 436, (the stepped part 378 of) the casing 350 is supported on (the stepped part 436 of) the casing support member 434.

[Operations of the Present Embodiment]

The attachment structure 312 for the lighting device 310 according to the present embodiment is constructed as described above. Next, an attachment procedure when the lighting device 310 is attached to the attachment structure 312, and irradiation of illuminating light 340 on the beverage container 330 from the lighting device 310 after attachment thereof will be described.

First, as shown in FIGS. 17 and 22, in a state with the lens 338 facing in the direction of the arrow C1, the light source accommodating unit 354 is arranged on the side of the arrow B1 direction, and the connector fitting section 358 is arranged on the side of the arrow B2. According to the present invention, as shown in FIG. 22, if the lighting device 310 remains within the range of the angle α with respect to the arrow B2 direction side of the attachment structure 312, then from any angle α with respect to the attachment structure 312, the casing 350 can be inserted into the tubular shaped main body portion 400. Consequently, according to the present embodiment, when the lighting device 310 is attached to the attachment structure 312, the lighting device 310 may be positioned with respect to the attachment structure 312 in such a manner that, at least, the lens 338 faces in the direction of the arrow C1, the light source accommodating unit 354 is oriented toward the tubular shaped main body portion 400, and the connector fitting section 358 is distanced from the tubular shaped main body portion 400.

Next, from the state shown in FIGS. 17 and 22, the lighting device 310 is moved in the direction of the arrow B1 toward the tubular shaped main body portion 400. In this case, the side of the opening 410 in the direction of the arrow B2 is of a wide shape, and the relationship "a<b" is satisfied. Therefore, the thin-walled portions 420, 428 serve as guides, and the light source accommodating unit 354 can be inserted easily into the space between the side wall sections 404, 406.

Further, the opening 410 is of a shape that is opened continuously from the side in the direction of the arrow B2 of the tubular shaped main body portion 400 to the location of the recess 412. Therefore, even if the lighting device 310 is moved in the direction of the arrow B1 in a state with the lens 338 facing in the direction of the arrow C1, the lens 338 does not come into contact with any constituent elements of the attachment structure 312.

When the light source accommodating unit 354 is guided in the space between the side wall sections 404, 406, the side surfaces 384, 388 of the light source accommodating unit 354 are in surface contact, respectively, with the side wall sections 404, 406, together with the claw members 386, 390 being fitted respectively into the fitting grooves 418, 426. On the other hand, the bottom surface 376 of the connector fitting section 358 that constitutes the stepped part 378 also contacts the guide surface 438.

In this case, when the connector fitting section 358 is moved integrally with the light source accommodating unit 354 in the direction of arrow B1 in a state with the bottom surface 376 thereof in contact with the guide surface 438, the connector fitting section 358 can be guided smoothly to the stepped part 436 along the guide surface 438. More specifically, due to the inclined guide surface 438, the bottom surface 376 is guided onto the parallel stepped part 436 along the directions of the arrow B, and as a result, the lighting device 310 can be advanced as a whole in the direction of the arrow B1 substantially in parallel with respect to the tubular shaped main body portion 400.

In addition, when the lighting device 310 is moved further in the direction of the arrow B1, by a guiding action of the light source accommodating unit 354 performed by the side wall sections 404, 406 and the fitting grooves 418, 426, and a guiding action of the stepped part 378 performed by the stepped part 436, the lighting device 310 is oriented in the direction of the arrow B1, and can be further inserted into the tubular shaped main body portion 400.

More specifically, the side surfaces 384, 388 are placed in surface contact, respectively, with the side wall sections 404, 406, and the claw members 386, 390 are fitted respectively into the fitting grooves 418, 426. Further, the stepped part 436 is of a shape that corresponds with that of the stepped part 378. The bottom surface 374 of the light source accommodating unit 354, and the bottom surface 376 of the connector fitting section 358 are supported, respectively, on the stepped part 436. Owing thereto, a condition is established in which the position of (the light source accommodating unit 354 and the connector fitting section 358 of) the lighting device 310 in the directions of the arrow A and the directions of the arrow C is regulated. Consequently, the lighting device 310 is moved in the direction of the arrow B1, in a state in which the position thereof in the directions of the arrow A and in the directions of the arrow C is constrained.

In addition, in the case that portions on the side in the direction of the arrow C2 on the corners 380, 382 (i.e., locations corresponding to side surfaces in the direction of the arrow B1 of the connector fitting section 358 that makes up the stepped part 378) have come into abutment against the claw parts 422, 430, when the lighting device 310 is then moved further in the direction of the arrow B1, by a pressing force from the corner 380, the claw part 422 is bent backward integrally in the direction of the arrow A2 about a distal end portion of the side wall section 404. Further, by a pressing force from the corner 382, the claw part 430 is bent backward integrally in the direction of the arrow A1 about a distal end portion of the side wall section 406.

In this state, when the lighting device 310 is moved further in the direction of the arrow B1, the corners 380, 382 pass beyond the claw parts 422, 430, the side surface 416 of the light source accommodating unit 354 comes into abutment against the pressing parts 414, and the stepped part 378 abuts against the stepped part 436. Consequently, the claw parts 422, 430 are released from the condition of being pressed by the corners 380, 382, and return to their original state prior to being pressed.

As a result, the claw parts 422, 430 engage with the corners 380, 382, and the light source accommodating unit 354 is pressed in the direction of the arrow B1. Further, the pressing part 424 that is formed proximate the side wall section 404 of the claw part 422 presses a location near the corner 380 of the side surface 384 in the direction of the arrow A1. Further, the pressing part 432 that is formed proximate the side wall section 406 of the claw part 430 presses a location near the corner 382 of the side surface 388 in the direction of the arrow A2. Further still, the pressing parts 414 press the side surface 416 of the light source accommodating unit 354 in the direction of the arrow B2. In addition, by the stepped part 378 abutting against the stepped part 436, the casing 350 is fixedly supported on the casing support member 434.

Consequently, by the pressing parts 414, 424, 432, the claw parts 422, 430, and the stepped part 436, the position of the light source accommodating unit 354 is restricted in the directions of the arrow A and in the directions of the arrow B.

In addition, as has been noted previously, due to surface contact between the side surfaces 384, 388 and the side wall sections 404, 406, and fitting engagement between the claw members 386, 390 and the fitting grooves 418, 426, the positions of the light source accommodating unit 354 and the connector fitting section 358 are restricted in the directions of the arrow A and in the directions of the arrow C. Therefore, the lighting device 310 is attached and fixedly supported in a predetermined position of the attachment structure 312 shown in FIGS. 10 through 14 and FIGS. 18 through 20.

In this case, the lens 338 is positioned at a location in front of the recess 412 and is exposed to the exterior. Consequently, the lens 338 can be prevented from coming into contact with constituent elements of the attachment structure 312, while at the same time, a condition is established enabling the illuminating light 340 to be output externally through the lens 338.

In the case that the lighting device 310 is attached to the attachment structure 312 in the foregoing manner, when power is supplied from a non-illustrated vehicle battery to the light source 352 through the connector 356, the light source 352 is driven, and the illuminating light 340 is emitted. The emitted illuminating light 340 is focused by the lens 338 and is irradiated to the exterior. As a result, the illuminating light 340 from the lens 338 passes through the hole 336, and the beverage container 330 is illuminated thereby.

When the illuminating light 340 is irradiated on the beverage 342 inside the beverage container 330, the illuminating light 340 is reflected into the vehicle compartment from the beverage container 330 as reflected light, and consequently, by a passenger inside the vehicle compartment viewing the reflected light, it can be confirmed that the beverage 342 exists inside the beverage container 330.

[Modifications of the Present Embodiment]

The present embodiment is not limited by the description presented above, and it is a matter of course that various modifications can be made thereto.

For example, as shown in FIG. 23, a hole 452 may be provided in a bottom wall 450 of the drink holder 332, and the attachment structure 312 may be disposed at a location directly beneath the hole 452 at a lower end part 320 of the upper member 316. In this case, the attachment structure 312 may be disposed such that the lens 338 faces the hole 452, and the lighting device 310 may be fixedly attached to the attachment structure 312.

In this case, after attachment of the lighting device 310, when the illuminating light 340 is irradiated in the direction of the arrow Z2 through the lens 338 from the lighting device 310, the illuminating light 340 passes through the hole 452, and the beverage container 330 that is held in the drink holder 332 is illuminated thereby. When the illuminating light 340 is applied to the beverage 342 in the interior of the beverage container 330, the illuminating light 340 is reflected into the vehicle compartment from the beverage container 330 as reflected light. By a passenger inside the vehicle compartment viewing the reflected light, it can easily be confirmed whether the beverage 342 exists inside the beverage container 330.

[Method of Manufacturing the Attachment Structure]

The attachment structure 312 for the lighting device 310 according to the present embodiment, for example, can be formed integrally with the upper member 316, using a mold apparatus 454 as shown in FIG. 24.

The mold apparatus 454 is constituted from a core 456 that is convexly shaped in cross section, and a cavity 458 that is concavely shaped in cross section. In this case, in a state in which the core 456 and the cavity 458 are combined, a plastic material 460 that becomes the upper member 316 is poured into or cast in a gap between the core 456 and the cavity 458, whereby the upper member 316 and the attachment structure 312 can be formed together in an integral manner More specifically, the mold apparatus 454 is capable of forming the upper member 316 and the attachment structure 312 integrally, without the use of sliding mold technology.

After molding thereof, by separating the core 456 and the cavity 458 mutually in the directions of the arrows, the upper member 316 including the attachment structure 312 can be taken out.

[Advantages of the Present Embodiment]

As has been described above, by the attachment structure 312 for the lighting device 310 according to the present invention, the casing support member 434 of the attachment structure 312 is equipped with the stepped part 436 that matches with the shape of the stepped part 378 of the casing 350. Therefore, in the case that the lighting device 310 is inserted into the attachment structure 312, the stepped part 436 functions as a receiving member with respect to the stepped part 378 of the casing 350. More specifically, since the stepped part 436 is of a shape corresponding to the stepped part 378, when the casing 350 is inserted into the attachment structure 312, and the stepped part 378 abuts against the stepped part 436, the stepped part 436 functions as a pedestal with respect to the stepped part 378. Consequently, the stepped part 378 of the casing 350 can be supported easily by the stepped part 436, and the lighting device 310 can be stably supported.

Further, according to the present embodiment, since at least the light source accommodating unit 354 in which the light source 352 is accommodated is supported by the stepped part 436, the light source 352 and the light source accommodating unit 354 can be stably supported.

Furthermore, by a central portion along the directions of the arrow A on the stepped part 378 of the casing 350 being supported by the stepped part 436, the lighting device 310 can be supported more stably.

Further still, by the distal end portion of the casing support member 434 being formed as the inclined guide surface 438, when the lighting device 310 is inserted into the attachment structure 312, the guide surface 438 exists on the attachment path (attachment trajectory). Consequently, the position of the lighting device 310 relative to the attachment structure 312 immediately prior to attachment thereof can be enlarged to the range of the angle α shown in FIG. 22. As a result, the degree of freedom for setting the attachment trajectory of the lighting device 310 with respect to the attachment structure 312 can be increased, and the ability to insert (ease of attachment of) the lighting device 310 with respect to the attachment structure 312 can be enhanced.

Further, when the lighting device 310 is inserted into the attachment structure 312, the stepped part 436 supports the stepped part 378 of the casing 350, the claw members 386, 390 provided on the light source accommodating unit 354 are fitted into the fitting grooves 418, 426, and the side wall sections 404, 406 are placed in surface contact with the side surfaces 384, 388 of the light source accommodating unit 354. Owing thereto, in a plane (the plane defined by the directions of the arrow A and the directions of the arrow C) perpendicular to the direction of the arrow B1, which is the direction in which the lighting device 310 is inserted, the casing support member 434, the side wall sections 404, 406, and the fitting grooves 418, 426 are capable of constraining the position of the lighting device 310. As a result, the lighting device 310 can be supported in a more stable manner.

Moreover, the claw parts 422, 430, the fitting grooves 418, 426, and the thin-walled portions 420, 428 are formed substantially in parallel with the directions of the arrow B, while in addition, since the fitting grooves 418, 426 and the thin-walled portions 420, 428 are disposed above the claw parts 422, 430, the attachment structure 312 can be reduced in size as a whole. As a result, the lighting device 310, which is attached to the attachment structure 312, can be made smaller in scale.

Furthermore, because the casing support member 434 and the side wall sections 404, 406 are interconnected through the bottom wall section 408, the rigidity of the attachment structure 312 can be increased.

Further, in accordance with the attachment structure 312 for the lighting device 310 according to the present embodiment, the opening 410, through which the lens 338 is exposed to the exterior when the lighting device 310 is inserted into the tubular shaped main body portion 400, is formed in the upper wall section 402 of the tubular shaped main body portion 400, in facing relation to the lens 338 of the casing 350. Therefore, in the case that the lighting device 310 has been attached to the attachment structure 312, no constituent elements of the attachment structure 312 are arranged around the periphery of the lens 338. Consequently, the lighting device 310 can be supported stably, while the optical axes of the light source 352 and the lens 338 can freely be set.

Further, at the corners 380, 382 of the light source accommodating unit 354, which are distanced from the lens 338 and the light source 352, the light source accommodating unit 354 is fixedly supported by the claw parts 422, 430. Owing thereto, the light source accommodating unit 354 can be supported stably, without any constituent elements of the attachment structure 312 being arranged around the periphery of the lens 338.

Furthermore, the interval "b" between the two thin-walled portions 420, 428 is set more widely than the interval "a" between the two side wall sections 404, 406 (a<b). Therefore, when the light source accommodating unit 354 is inserted into the tubular shaped main body portion 400, the light source accommodating unit 354 can be inserted from an arbitrary direction (within the range of the angle α shown in FIG. 22) with respect to the tubular shaped main body portion 400. As a result, the ability to insert the lighting device 310 with respect to the attachment structure 312, and the ability to assemble (ease of attachment of) the lighting device 310 with respect to the attachment structure 312 can be enhanced.

Further, the two claw parts 422, 430 extend along the two side surfaces 384, 388 of the light source accommodating unit 354 from distal end portions of the two side wall sections 404, 406, and the claw parts 422, 430 engage with the corners 380, 382 of the light source accommodating unit 354. Consequently, the light source accommodating unit 354 is sandwiched between the two claw parts 422, 430, and is pressed relative to the attachment structure 312 along the direction of insertion (the direction of the arrow B1) of the lighting device 310. As a result, the light source accommodating unit 354 can be supported in a more stable manner.

Furthermore, by the two claw parts 422, 430 engaging with the corners 380, 382 of the light source accommodating unit 354, the lighting device 310 including the light source accommodating unit 354 is fixedly supported. Consequently, it is unnecessary for the shape of the lighting device 310 to be changed depending on the shape of the attachment structure 312, and an increase in the size of the lighting device 310 can be avoided.

More specifically, the lighting device 310 is fixedly supported by the two claw parts 422, 430, which are disposed remotely from the lens 338, engaging with the corners 380, 382 of the light source accommodating unit 354. Therefore, even if the size of the lighting device 310 cannot be changed corresponding to the shape of the attachment structure 312 (for example, in the case that the size of the lighting device 310 or the light source accommodating unit 354 cannot be changed, due to the inability to change the size of the lens 338), the lighting device 310 can still be fixedly supported. Further, since the claw parts 422, 430 engage with the corners 380, 382 of the light source accommodating unit 354, there is no need for the size of the casing support member 434 to be changed depending on the shape of the lighting device 310, and an increase in the size of the attachment structure 312 can be avoided.

Further, the two thin-walled portions 420, 428 project more toward the side of the lighting device 310 than the two claw parts 422, 430, and the two claw parts 422, 430 are not disposed at the locations of the two widely-spaced thin-walled portions 420, 428. Therefore, it is easy for the light source accommodating unit 354 to be inserted into the tubular shaped main body portion 400. Further, when the corners 380, 382 of the light source accommodating unit 354 are moved to the positions of the two claw parts 422, 430, the two claw parts 422, 430 engage with the corners 380, 382 of the light source accommodating unit 354, and therefore, the light source accommodating unit 354 can be supported reliably.

The two convexly-shaped pressing parts 424, 432 press against the two side surfaces 384, 388 of the light source accommodating unit 354, at locations near to the two side wall sections 404, 406 on the two claw parts 422, 430. In addition, the pressing parts 424, 432 are formed so as to fill a clearance between the light source accommodating unit 354 and the claw parts 422, 430. Accordingly, since the two pressing parts 424, 432 cooperate with the two claw parts 422, 430 in pressing on the light source accommodating unit 354, looseness or chattering of the lighting device 310 with respect to the attachment structure 312 can be prevented, and the light source accommodating unit 354 can be supported stably and reliably. Further, by providing the pressing parts 424, 432 on the claw parts 422, 430, it is possible to increase the rigidity of the claw parts 422, 430.

Further, the claw members 386, 390 are formed in tapered shapes, and the fitting grooves 418, 426 also are formed with tapered shapes in cross section. Owing thereto, in a plane (the plane defined by the directions of the arrow A and the directions of the arrow C) perpendicular to the direction of insertion of the lighting device 310 (the direction of the arrow B1), the position of the lighting device 310 can easily be constrained, and the lighting device 310 can reliably and stably be supported.

Furthermore, by the extension 433, which forms a part of the bottom wall section 408, extending to the connector fitting section 358, ease of attachment of the lighting device 310 with respect to the attachment structure 312 can be further enhanced, and the lighting device 310 can be supported in a more stable fashion.

Further, by the opening 410 continuously opening along the direction of insertion (direction of the arrow B1) of the lighting device 310 with respect to the tubular shaped main body portion 400, the light source accommodating unit 354 can be inserted into the tubular shaped main body portion 400 without causing damage to the lens 338.

Furthermore, the pressing parts 414 function as stoppers that press on the side surface 416 of the light source accommodating unit 354 that has been inserted into the tubular shaped main body portion 400. Owing to this feature, the lighting device 310 can reliably be supported at a desired position (a position where the lens 338 does not contact any constituent elements of the attachment structure 312) along the direction of insertion of the lighting device 310.

Further, according to the present embodiment, without the need for using separate components such as brackets, or threaded members such as screws, tapping screws, or the like, and without the use of sliding mold technology, the attachment structure 312 and the upper member 316 can be formed together integrally responsive to the shape of the lighting device 310. As a result, an increase in size of the lighting device 310 can be avoided.

Furthermore, by fixing the lighting device 310 to the attachment structure 312 that is provided on the upper member 316, the illuminating light 340 can be radiated or made to shine reliably from the lighting device 310 toward the beverage container 330 that is accommodated in the drink holder 332 disposed in the upper member 316.

SUMMARY OF THE INVENTION

Incidentally, in Japanese Patent No. 4933240, attachment of a lighting device to a door lining is disclosed, in which one end of the lighting device is fixed to a vehicle door lining using screws, and another end of the lighting device is supported using an engagement piece provided on the door lining.

However, when the lighting device is attached to a door lining as an inner-mounted member of the vehicle using an attachment structure of this type, depending on the attachment location of the lighting device and the shape of the lighting device, cases occur in which the lighting device cannot be attached stably with respect to the attachment structure. As a result, there are circumstances in which it becomes difficult for illuminating light from the lighting device to be irradiated stably and reliably with respect to an object to be illuminated. For example, in the case that the size of the lighting device does not match with the size of the screw attachment locations and the size of the engagement piece, it is necessary for the lighting device to be increased in size to coincide with the shape of the attachment structure.

For resolving this type of problem, it is desirable for the attachment structure and the door lining to be formed integrally corresponding to the shape of the lighting device, and for the lighting device to be capable of being supported in a stable condition, without using separate components such as brackets, or threaded members such as screws, tapping screws or the like. In this case, it is preferable for the door lining and the attachment structure to be formed together integrally without use of sliding mold technology.

Further, in the case that the lighting device is supported by such an attachment structure, it is desirable for the optical axis of the light source that makes up the lighting device, and the optical axis of the lens through which illuminating light output from the light source passes to be capable of being freely adjusted.

According to the present embodiment, in the attachment structure 312 for attaching the lighting device 310 to the door lining 314 (attachment object), the attachment structure 312 includes the casing support member 434 (supporting member), which supports the lighting device 310 when the lighting device 310 is inserted. The lighting device 310 includes the light source 352 that outputs the illuminating light 340, and the casing 350 in which the light source 352 is accommodated, and which is formed with a stepped shape along the direction of insertion of the attachment structure 312. The casing support member 434 is equipped with the stepped part 436 of a shape corresponding to the stepped part 378 of the casing 350, and the stepped part 378 of the casing 350 that is inserted into the attachment structure 312 is supported by the stepped part 436.

Within the stepped part 378 of the casing 350, the casing support member 434 supports at least a location thereof on the side of the light source 352. The stepped part 436 supports a central portion in the transverse direction on the stepped part 378 of the casing 350.

A distal end portion in the casing support member 434 on the side of the casing 350 is formed as an inclined guide surface 438 that guides the lighting device 310 in the attachment structure 312 along the direction of insertion thereof.

The attachment structure 312 further includes the bottom wall section 408 (connecting member) that interconnects the casing support member 434 and the side wall sections 404, 406. The attachment structure 312 is formed integrally with the door lining 314.

In a state in which the lighting device 310 is attached to the attachment structure 312, the lighting device 310 outputs illuminating light 340 directed toward the beverage 342 (object to be illuminated) that is held in the drink holder 332 disposed in the door lining 314.

The lighting device 310 includes the light source 352 that outputs illuminating light 340, the casing 350 that accommodates the light source 352, and the lens 338 disposed on one side surface of the casing 350 and through which the illuminating light 340 passes. The attachment structure 312 includes the tubular shaped main body portion 400 into which the lighting device 310 is inserted. Within the tubular shaped main body portion 400, on a side surface thereof facing the lens 338, the opening 410 is formed through which the lens 338 is exposed to the exterior when the lighting device 310 is inserted into the tubular shaped main body portion 400.

The casing 350 comprises the light source accommodating unit 354 that accommodates the light source 352 and has the lens 338 provided therein, and which is inserted into the tubular shaped main body portion 400. The opening 410 is formed such that, when the light source accommodating unit 354 is inserted into the tubular shaped main body portion 400, one side surface on the light source accommodating unit 354 on which the lens 338 is disposed remains exposed through the opening 410. In the tubular shaped main body portion 400, the claw parts 422, 430 (engagement parts) are provided, which engage with the corners 382 of the light source accommodating unit 354 that are distanced from the lens 338.

On the tubular shaped main body portion 400, the two side wall sections 404, 406 are provided, which are in surface contact with the two facing side surfaces 384, 388, among the four side surfaces of the light source accommodating unit 354, where the lens 338 is not disposed. The claw parts 422, 430 extend along the two side surfaces 384, 388, from distal ends of the two side wall sections 404, 406. The thin-walled portions 420, 428 further extend substantially in parallel with the two claw parts 422, 430, along the two side surfaces 384, 388 from the distal ends of the two side wall sections 404, 406. The interval "b" between the two thin-walled portions 420, 428 is wider than the interval "a" between the two side wall sections 404, 406.

The two thin-walled portions 420, 428 project on the sides of the lighting device 310 more than the two claw parts 422, 430. The convexly-shaped pressing parts 424, 432 (side surface pressing parts), which press against the two side surfaces 384, 388 of the light source accommodating unit 354, are formed on the two claw parts 422, 430 at locations near to the two side wall sections 404, 406.

The claw members 386, 390 (projections) are formed on the two side surfaces 384, 388 of the light source accommodating unit 354. On the two side wall sections 404, 406, the fitting grooves 418, 426 that fit with the claw members 386, 390 are formed along the direction of insertion of the light source accommodating unit 354 relative to the tubular shaped main body portion 400, such that when the light source accommodating unit 354 is inserted into the tubular shaped main body portion 400, in a state in which the claw members 386, 390 are fitted in the fitting grooves 418, 426, the two side surfaces 384, 388 of the light source accommodating unit 354 are placed in surface contact with the two side wall sections 404, 406.

The claw members 386, 390 are formed in tapered shapes, and the fitting grooves 418, 426 also are formed with tapered shapes in cross section, which correspond with the tapered shapes of the claw members 386, 390.

The casing 350 is constituted from the light source accommodating unit 354, and the connector fitting section 358, which is contiguous to the light source accommodating unit 354 away from the tubular shaped main body portion 400 and is fitted into the connector 356. In the tubular shaped main body portion 400, the bottom wall section 408 is provided, which supports the bottom surface 372 (other side surface) that opposes the upper surface 360 (one side surface) on the casing 350 where the lens 338 is disposed. The bottom wall section 408 extends up to the connector fitting section 358.

The opening 410 opens continuously along the direction in which the lighting device 310 is inserted relative to the tubular shaped main body portion 400. The pressing parts 414 (distal end pressing parts), which press on the distal end of the lighting device 310 that has been inserted into the tubular shaped main body portion 400, are provided in the tubular shaped main body portion 400.

The present invention is not limited to the embodiments described above, and naturally various modified or additional configurations may be adopted therein without departing from the scope of the present invention. For example, the attachment structure for a lighting device according to the present invention can be applied to arbitrary attachment objects apart from a door lining.

The invention claimed is:

1. An attachment structure for a lighting device, comprising:
   a pedestal disposed on a curved surface of an attachment object and configured to include a flat plate-shaped base section that extends along a vertical direction; and
   an attachment member configured to fix the lighting device with respect to the base section,
   wherein the attachment member includes
   a supporting wall section attached to and extending away from one side of the base section,
   a side wall portion attached to and extending away from another side of the base section,
   a protrusion provided on the base section and which extends substantially in a horizontal direction,
   a projection which projects out toward the side wall portion from the supporting wall section, and
   a claw member provided on a distal end of the supporting wall section,
   the lighting device is fixed with respect to the base section by the claw member being placed in contact with a back surface of the lighting device while the protrusion is placed in contact with a front surface of the lighting device in an installed configuration of the lighting device,
   movement of the lighting device in a vertically downward direction with respect to the base section is restricted by the side wall portion being placed in contact with a flange formed on a side wall of the lighting device in the installed configuration of the lighting device,
   chattering of the lighting device with respect to the base section is suppressed by the side wall portion being placed in contact with one side surface of the lighting device and by the projection being placed in contact with another side surface of the lighting device in the installed configuration of the lighting device.

2. The attachment structure for the lighting device according to claim 1, wherein the pedestal is configured such that the movement of the lighting device in the vertically downward direction with respect to the base section is able to be restricted.

3. The attachment structure for the lighting device according to claim 1, wherein
   the side wall section is configured to be placed in surface contact with the one side surface of the lighting device in the installed configuration of the lighting device, and
   the projection is configured to be placed in line contact with the another side surface of the lighting device in the installed configuration of the lighting device.

4. The attachment structure for the lighting device according to claim 3, wherein
   the projection extends along a direction of extension of the supporting wall section with a cross-section thereof being formed in an arcuate shape.

5. The attachment structure for the lighting device according to claim 3, wherein
   the projection is formed so as to have a lengthwise dimension shorter than a lengthwise dimension of the supporting wall section.

6. The attachment structure for the lighting device according to claim 1, wherein
the projection is formed so as to have a widthwise dimension shorter than a widthwise dimension of the supporting wall section.

7. The attachment structure for the lighting device according to claim 1, wherein
a draft angle oriented toward a distal end of the side wall section is set on a contact surface of the side wall section that is placed in contact with the lighting device in the installed configuration of the lighting device, and
the supporting wall section is attached to and extends away from the base section while being inclined with respect to a line perpendicular to a plane of the base section toward the side wall section, at an angle that is substantially the same as the draft angle.

8. The attachment structure for the lighting device according to claim 7, wherein
a contact surface of the protrusion configured to be placed in contact with the lighting device in the installed configuration of the lighting device is inclined with respect to the plane of the base section toward the side wall section and the base section, at an angle that is substantially the same as the draft angle.

9. The attachment structure for the lighting device according to claim 1, wherein
a die-cut hole is formed on the side wall section at a location facing the supporting wall section.

10. The attachment structure for the lighting device according to claim 1, wherein
the pedestal includes an upper side wall section that is disposed integrally with an upper end of the base section and the curved surface of the attachment object and restricts vertical downward movement of the lighting device with respect to the pedestal by a connecting member contacting the upper side wall section, wherein the connecting member projects more than the front surface of the lighting device in a forward direction from a casing that has the front surface of the lighting device and the connecting member is connected to an end of a light guide.

11. The attachment structure for the lighting device according to claim 10, wherein
the pedestal includes a lower side wall section disposed integrally with a lower end of the base section and the curved surface of the attachment object.

12. The attachment structure for the lighting device according to claim 1, wherein
the attachment member includes a movement restricting member configured to restrict upward movement of the lighting device with respect to the base section by being positioned vertically more upward than the base section and contacting an upper surface of the lighting device.

* * * * *